(12) United States Patent
Hosotani

(10) Patent No.: US 9,378,888 B2
(45) Date of Patent: *Jun. 28, 2016

(54) POWER TRANSFER SYSTEM

(71) Applicant: Murata Manufacturing Co., Ltd., Nagaokakyo-shi, Kyoto-fu (JP)

(72) Inventor: Tatsuya Hosotani, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 490 days.

This patent is subject to a terminal disclaimer.

(21) Appl. No.: 13/944,908

(22) Filed: Jul. 18, 2013

(65) Prior Publication Data
US 2013/0300210 A1    Nov. 14, 2013

Related U.S. Application Data

(63) Continuation of application No. PCT/JP2011/078246, filed on Dec. 7, 2011.

(30) Foreign Application Priority Data

Jan. 26, 2011    (JP) .................................. 2011-014614

(51) Int. Cl.
| | |
|---|---|
| *H01F 38/14* | (2006.01) |
| *H02J 17/00* | (2006.01) |
| *H02J 5/00* | (2016.01) |
| *H02M 3/337* | (2006.01) |
| *H02J 7/02* | (2016.01) |
| *H02M 1/00* | (2006.01) |

(52) U.S. Cl.
CPC ................ *H01F 38/14* (2013.01); *H02J 5/005* (2013.01); *H02J 17/00* (2013.01); *H02J 7/025* (2013.01); *H02M 3/3376* (2013.01); *H02M 2001/0058* (2013.01); *Y02B 70/1433* (2013.01); *Y02B 70/1491* (2013.01)

(58) Field of Classification Search
None
See application file for complete search history.

(56) References Cited

U.S. PATENT DOCUMENTS

| | | | |
|---|---|---|---|
| 5,095,224 A | 3/1992 | Renger | |
| 2006/0077600 A1 | 4/2006 | Yasumura | |

(Continued)

FOREIGN PATENT DOCUMENTS

| | | |
|---|---|---|
| JP | 61-224735 A | 10/1986 |
| JP | 03-243023 A | 10/1991 |

(Continued)

OTHER PUBLICATIONS

Official Communication issued in International Patent Application No. PCT/JP2011/078246, mailed on Feb. 21, 2012.

Hosotani et al., "A Novel Multi-Resonant Current ZVS Converter Operated in Fixed Frequency", IEICE Technical Report, Jan. 27, 2011, 6 pages.

*Primary Examiner* — Carlos Amaya
*Assistant Examiner* — Aqeel Bukhari
(74) *Attorney, Agent, or Firm* — Keating & Bennett, LLP

(57) ABSTRACT

A power-transmission-unit-side resonant circuit includes a resonant capacitor connected in series with a power transmission coil and a power-reception-unit-side resonant circuit including a resonant capacitor connected in series with a power reception coil resonate with each other to cause sympathetic vibration. This allows power to be transferred using two kinds of coupling via the magnetic field and the electric field between the power transmission coil and the power reception coil. Also, operation is performed at a switching frequency that is higher than a specific resonant frequency of the entire multi-resonant circuit, such that a ZVS operation is performed. As a result, a switching loss is reduced by a large amount and a highly efficient operation is performed thus enabling a power transfer system with a reduced size and an increased power conversion efficiency to be provided.

20 Claims, 11 Drawing Sheets

(56) References Cited

U.S. PATENT DOCUMENTS

| | | |
|---|---|---|
| 2007/0008744 A1 | 1/2007 | Heo et al. |
| 2007/0252441 A1 | 11/2007 | Yamauchi et al. |

FOREIGN PATENT DOCUMENTS

| | | |
|---|---|---|
| JP | 04-285436 A | 10/1992 |
| JP | 06-046561 A | 2/1994 |
| JP | 07-322613 A | 12/1995 |
| JP | 09-308243 A | 11/1997 |
| JP | 11-008910 A | 1/1999 |
| JP | 2006-050689 A | 2/2006 |
| JP | 2006-074897 A | 3/2006 |
| JP | 2006-101651 A | 4/2006 |
| JP | 2006-230032 A | 8/2006 |
| JP | 2007-020391 A | 1/2007 |
| JP | 2008-104295 A | 5/2008 |
| JP | 2008-206327 A | 9/2008 |
| WO | 2006/022365 A1 | 3/2006 |

POWER TRANSFER SYSTEM

BACKGROUND OF THE INVENTION

1. Field of the Invention

The present invention relates to a power transfer system including a power transmission unit and a power reception unit.

2. Description of the Related Art

As the size, weight, and power consumption of electronic devices decrease and as the capacity of batteries increases, more and more battery-driven electronic devices have been used recently. Also, wireless data communication has been increasingly used between devices at a close distance. In light of such circumstances, a technique for transferring power in a non-contact manner is demanded.

For example, as presented in Japanese Unexamined Patent Application Publication No. 2008-206327, existing non-contact charging systems include a power transmission unit which includes a primary coil provided in a charger cradle or the like, and a mobile electronic device which includes a secondary coil and a rechargeable battery. The user places the mobile electronic device on the power transmission unit. This consequently generates electromagnetic inductive coupling (magnetic coupling) between the primary coil included in the power transmission unit and the secondary coil included in the mobile electronic device. As a result, power is supplied to the to-be-charged device side and the secondary battery is charged.

However, in the power transfer system of Japanese Unexamined Patent Application Publication No. 2008-206327, the power transmission coil and the power reception coil function as an electromagnetic-induction-based isolation transformer and thus are used merely as a magnetic-coupling-based transformer. It is essential for electromagnetic-induction-based transformers to efficiently convert electric energy into magnetic energy and then into electric energy by linking magnetic flux produced by current flowing through the primary winding to the secondary winding so as to cause current to flow through the secondary winding. A ratio of magnetic flux linked to the secondary winding to magnetic flux produced by current flowing through the primary winding is generally called the amount of (magnetic) coupling. In order to increase the power conversion efficiency, it is essential for electromagnetic-induction-based transformers to increase the degree of magnetic coupling. However, in many cases, it is difficult to increase the degree of magnetic coupling in transformers in order to prevent magnetic saturation or because of physical restraints. As a result, the power conversion efficiency decreases.

In addition, in power transfer systems, because power is transferred after impedance matching (matching) is performed, the operating frequency is generally changed during control. In electronic devices, on the other hand, the usable frequency band is decided for each device. Thus, operation at a fixed frequency is preferable in the light of EMC (electromagnetic compatibility), transferred energy controllability, and so forth.

SUMMARY OF THE INVENTION

Preferred embodiments of the present invention provide a power transfer system with a higher power conversion efficiency achieved when power is transferred, without increasing the size thereof.

A power transfer system according to a preferred embodiment of the present invention includes a power transmission unit including a power transmission coil and a power reception unit including a power reception coil, wherein the power transmission unit includes a power-transmission-unit-side resonant capacitor that constitutes a power-transmission-unit-side resonant circuit together with the power transmission coil, and a power-transmission-unit-side alternating-current voltage generation circuit that is connected to the power transmission coil, that includes a switching circuit, and that generates an alternating-current voltage from a direct-current voltage input thereto, the switching circuit being a parallel circuit in which a switching element, a diode, and a capacitor are connected in parallel with each other, the power reception unit includes a power-reception-unit-side resonant capacitor that constitutes a power-reception-unit-side resonant circuit together with the power reception coil, and a power-reception-unit-side rectifier circuit that is connected to the power reception coil and that rectifies an alternating-current voltage produced in the power reception coil into a direct-current voltage, wherein mutual inductance and mutual capacitance that are equivalently generated between the power transmission coil and the power reception coil constitute an electromagnetic coupling circuit, the power-transmission-unit-side resonant circuit and the power-reception-unit-side resonant circuit resonate with each other, and power is transferred from the power transmission unit to the power reception unit, wherein energy (reactive power) of power that has not been transmitted from the power transmission unit is retained in the power-transmission-unit-side resonant circuit as resonance energy, and energy (reactive power) that has not been supplied to an output among energy of power received by the power reception unit is retained in the power-reception-unit-side resonant circuit as resonance energy.

According to another preferred embodiment of the present invention, a power transfer system includes a power transmission unit including a power transmission coil, and a power reception unit including a power reception coil, wherein the power transmission unit includes a power-transmission-unit-side resonant capacitor that constitutes a power-transmission-unit-side resonant circuit together with the power transmission coil, and a power-transmission-unit-side alternating-current voltage generation circuit that is connected to the power transmission coil, that includes a switching circuit, and that generates an alternating-current voltage from a direct-current voltage input thereto, the switching circuit being a parallel circuit in which a switching element, a diode, and a capacitor are connected in parallel with each other, the power reception unit includes a power-reception-unit-side resonant capacitor that constitutes a power-reception-unit-side resonant circuit together with the power reception coil, and a power-reception-unit-side rectifier circuit that is connected to the power reception coil and that rectifies an alternating-current voltage produced in the power reception coil into a direct-current voltage, wherein mutual inductance that is equivalently generated between the power transmission coil and the power reception coil constitutes an electromagnetic coupling circuit, the power-transmission-unit-side resonant circuit and the power-reception-unit-side resonant circuit resonate with each other, and power is transferred from the power transmission unit to the power reception unit, energy (reactive power) of power that has not been transmitted from the power transmission unit is retained in the power-transmission-unit-side resonant circuit as resonance energy, and energy (reactive power) that has not been supplied to an output among energy of power received by the power reception unit is retained in the power-reception-unit-side resonant circuit as resonance energy.

According to yet another preferred embodiment of the present invention, a power transfer system includes a power transmission unit including a power transmission coil, and a power reception unit including a power reception coil, wherein the power transmission unit includes a power-transmission-unit-side resonant inductor that constitutes a power-transmission-unit-side resonant circuit together with a power transmission capacitor, and a power-transmission-unit-side alternating-current voltage generation circuit that is connected to the power transmission coil, that includes a switching circuit, and that generates an alternating-current voltage from a direct-current voltage input thereto, the switching circuit being a parallel circuit in which a switching element, a diode, and a capacitor are connected in parallel with each other, the power reception unit includes a power-reception-unit-side resonant inductor that constitutes a power-reception-unit-side resonant circuit together with a power reception capacitor, and a power-reception-unit-side rectifier circuit that is connected to the power reception coil and that rectifies an alternating-current voltage produced in the power reception coil into a direct-current voltage, wherein mutual capacitance that is equivalently generated between the power transmission coil and the power reception coil constitutes an electrical coupling circuit, the power-transmission-unit-side resonant circuit and the power-reception-unit-side resonant circuit resonate with each other, and power is transferred from the power transmission unit to the power reception unit, energy (reactive power) of power that has not been transmitted from the power transmission unit is retained in the power-transmission-unit-side resonant circuit as resonance energy, and energy (reactive power) that has not been supplied to an output among energy of power received by the power reception unit is retained in the power-reception-unit-side resonant circuit as resonance energy.

It is preferable that the power reception unit include an information transmission circuit that detects output information about an output from the power-reception-unit-side rectifier circuit and transmits the output information to the power transmission unit, and that the power transmission unit include an output information reception circuit that receives the output information, and a to-be-transferred power control circuit that controls the power-transmission-unit-side alternating-current voltage generation circuit in accordance with the output information so as to control to-be-transferred power.

For example, the information transmission circuit preferably is a circuit that transmits the output information via wireless communication, and the output information reception circuit preferably is a circuit that receives the output information via wireless communication.

Alternatively, for example, the information transmission circuit preferably is a circuit that converts an electric signal into an optical signal and transmits the output information as an optical signal, and wherein the output information reception circuit is a circuit that converts an optical signal into an electric signal and receives the output information as an electric signal.

It is preferable that the switching circuit include, for example, a high-side switching circuit and a low-side switching circuit, and that the power-transmission-unit-side alternating-current voltage generation circuit control to-be-transferred power by performing PFM (Pulse Frequency Modulation) in which a switching frequency at which the high-side switching circuit and the low-side switching circuit are alternately turned on/off is changed.

It is preferable that the switching circuit include, for example, a high-side switching circuit and a low-side switching circuit, and that the power-transmission-unit-side alternating-current voltage generation circuit control to-be-transferred power by performing ORM (On-periods Ratio Modulation) in which a ratio between conduction periods of a first switching circuit and a second switching circuit is modulated, while alternately turning the high-side switching circuit and the low-side switching circuit on/off at a fixed switching frequency.

It is preferable that the power-reception-unit-side rectifier circuit be a synchronous rectifier circuit including switching elements.

It is preferable that the power reception unit include an operating frequency control circuit that controls an operating frequency of the synchronous rectifier circuit, and control to-be-received power by using the operating frequency.

It is preferable that the power reception unit include a control circuit that controls a circuit included in the power reception unit, and the control circuit be operated using power received by the power reception unit.

It is preferable that when power is transferred from an output of the power-reception-unit-side rectifier circuit, the power-reception-unit-side rectifier circuit function as the power-transmission-unit-side alternating-current voltage generation circuit and the power-transmission-unit-side alternating-current voltage generation circuit function as the power-reception-unit-side rectifier circuit, enabling bidirectional power transfer.

It is preferable that when the power transfer system includes a plurality of the power reception units, the power-reception-unit-side resonant circuits of the plurality of power reception units have different resonant frequencies and the power-transmission-unit-side alternating-current voltage generation circuit switch the switching circuit on/off at a switching frequency corresponding to a destination to which power is to be transferred.

It is preferable that the switching frequency be set to be higher than a resonant frequency at which the power-transmission-unit-side resonant circuit and the power-reception-unit-side resonant circuit resonate with each other so that a phase of a waveform of a current that flows through the power transmission coil lags behind that of a waveform of the alternating-current voltage, and a dead time during which both the high-side switching element and the low-side switching element are in an off state be set so that a zero voltage switching operation is performed during the dead time.

It is preferable that a parallel resonant capacitor be provided in parallel with the power transmission coil or the power reception coil.

It is preferable that the parallel resonant capacitor be constituted by stray capacitance that serves as equivalent capacitance resulting from electrical coupling generated between the power transmission coil and the power reception coil.

It is preferable that the parallel resonant capacitor be constituted by stray capacitance that is generated between ends of the power transmission coil or the power reception coil.

For example, the power transmission coil and the power reception coil preferably are air-core inductors.

It is preferable that the mutual inductance be equivalent magnetizing inductance resulting from magnetic coupling generated between the power transmission coil and the power reception coil.

It is preferable that leakage inductance that is not involved in coupling, among an inductance component of the power transmission coil or the power reception coil, be used as an inductor that constitutes the power-transmission-unit-side resonant circuit or the power-reception-unit-side resonant circuit.

According to various preferred embodiments of the present invention, a power transmission unit and a power reception unit each include an LC resonant circuit. The two LC resonant circuits resonate with each other, and power can be transferred between a power transmission coil and a power reception coil using coupling via a magnetic field, an electric field, or both the magnetic and electric fields. Also, active power alone is transferred from the power transmission unit side to the power reception unit side using resonance, whereas reactive power is cyclically retained as resonance energy in the LC resonant circuits respectively provided at in the power transmission unit side and at the power reception unit side. Thus, a power loss can made significantly small.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
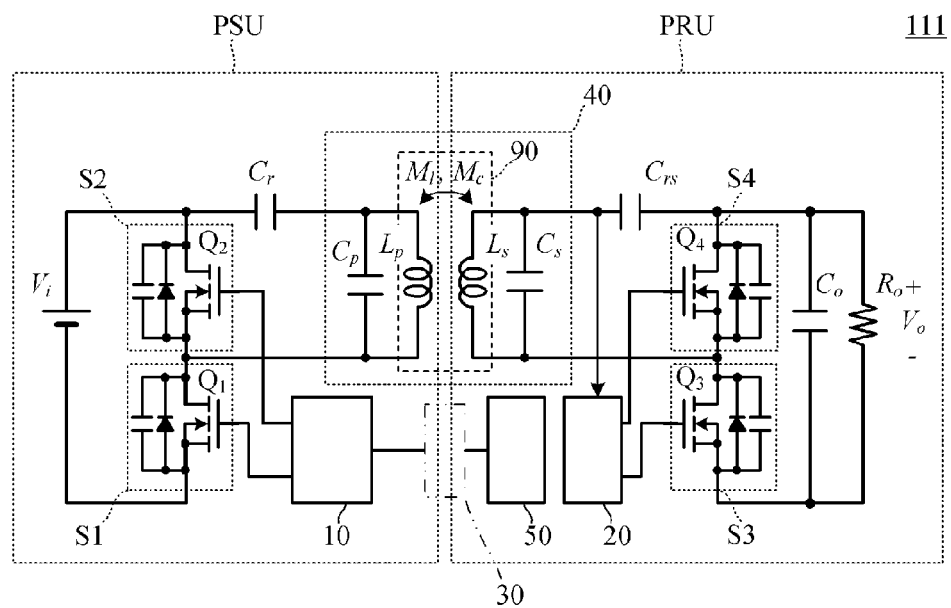
FIG. 1 is a circuit diagram of a power transfer system 111 according to a first preferred embodiment of the present invention.

FIG. 1 is a circuit diagram of a power transfer system 111 according to a first preferred embodiment of the present invention.

The power transfer system 111 includes a power transmission unit PSU and a power reception unit PRU.

The power transfer system 111 is a system that includes an input power supply Vi provided at an input of the power transmission unit PSU and supplies stable direct-current energy to a load Ro of the power reception unit PRU. The power transfer system 111 includes the following components.

An electromagnetic coupling circuit 90 includes a power transmission coil Lp and a power reception coil Ls.

A switching circuit S1 includes a switching element Q1 and a switching circuit S2 including a switching element Q2 that are connected to the power transmission coil Lp.

A switching circuit S3 includes a switching element Q3, a switching circuit S4 including a switching element Q4, and a smoothing capacitor Co that are connected to the power reception coil Ls.

A series resonant capacitor Cr is connected to the power transmission coil Lp.

A series resonant capacitor Crs is connected to the power reception coil Ls.

A switching control circuit 10 is connected to the switching elements Q1 and Q2.

A feedback control circuit 50 generates a control signal used to control the amount of power received by the power reception unit PRU.

A signal delivering device 30 transmits a feedback signal in an insulated state.

A parallel resonant capacitor Cp is connected in parallel with the power transmission coil Lp.

A parallel resonant capacitor Cs is connected in parallel with the power reception coil Ls.

A multi-resonant circuit 40 includes the electromagnetic coupling circuit 90 and the parallel resonant capacitors Cp and Cs.

The switching elements Q1 and Q2 are alternately turned on/off with a dead time under control of the switching control circuit 10, so as to shape the voltage waveform of the direct-current voltage V1 into a square wave or trapezoidal wave. On the other hand, the switching elements Q3 and Q4 alternately conduct, so as to shape the square or trapezoidal voltage waveform into a direct-current voltage. In accordance with a voltage signal supplied from the power reception coil Ls, a switching control circuit 20 controls synchronous rectification performed by the switching elements Q3 and Q4. In the power transfer system 111 according to the first preferred embodiment illustrated in FIG. 1, FETs such as MOSFETs may be used as the switching elements Q1, Q2, Q3, and Q4 and the switching circuits S1, S2, S3, and S4 may be constructed using parasitic output capacitances or parasitic diodes.

The feedback control circuit 50 detects an output (voltage, current, or power) fed to the load Ro and delivers feedback information to the power transmission unit PSU via the signal delivering device 30.

Referring to FIG. 1, a portion surrounded by a thick dashed line represents the electromagnetic coupling circuit 90, whereas a portion surrounded by a thin dotted line represents the multi-resonant circuit 40. A parameter MI illustrated in FIG. 1 denotes a mutual coupling coefficient of magnetic coupling, whereas Mc denotes a mutual coupling coefficient of electrical coupling. A mutual coupling coefficient M of electromagnetic coupling is obtained by combining mutual-inductance-based magnetic coupling (the mutual coupling coefficient MI) and mutual-capacitance-based electrical coupling (the mutual coupling coefficient Mc). In the multi-resonant circuit 40 including this electromagnetic coupling circuit 90, two LC resonant circuits respectively provided at the power transmission unit side and the power reception unit side resonate with each other.

The series resonant capacitor Cr of the power transmission unit PSU and an equivalent series resonant inductor (Lr: this Lr will be described later in relation to an equivalent circuit) that is connected in series with this series resonant capacitor Cr constitute a power-transmission-unit-side resonant circuit. Likewise, the series resonant capacitor Crs of the power reception unit PRU and an equivalent inductance (Lrs: this Lrs will also be described later in relation to the equivalent circuit) that is connected in series with this series resonant capacitor Crs constitute a power-reception-unit-side resonant circuit. The power-transmission-unit-side resonant circuit and the power-reception-unit-side resonant circuit resonate with each other, each causing sympathetic vibration, and power is transferred using two kinds of coupling generated by mutual inductance in a magnetic field and by mutual capacitance in an electric field between the power transmission coil Lp and the power reception coil Ls.

Note that the capacitors Cp and Cs facilitate power transfer via electromagnetic coupling. Specifically, the capacitors Cp and Cs and mutual capacitance (Cm), which is illustrated in an equivalent circuit later, constitute a π-type electrical-coupling-based power transfer circuit, through which power is transferred. This mutual capacitance Cm also constitutes an electrical-coupling-based power transfer circuit together with the resonant capacitors Cr and Crs.

Both the series resonant capacitors Cr and Crs also function as capacitors that hold direct-current voltages. At the power transmission unit PSU side, the capacitor Cr is charged during a conduction period of the switching element Q1, whereas the capacitor Cr is discharged during a conduction period of the switching element Q2. At the power reception unit PRU side, on the other hand, the switching element Q3 conducts to supply the load Ro with energy equivalent to the sum of a voltage produced in the power reception coil Ls and a voltage of the capacitor Crs while discharging the capacitor Crs, whereas the switching element Q4 conducts to charge the capacitor Crs with the voltage produced in the power reception coil Ls, so as to accumulate electrostatic energy. That is, voltages produced in the power reception coil Ls during the conduction periods of the switching elements Q3 and Q4 or the switching elements Q1 and Q2 are added and the resulting energy is output to the load Ro.

The two resonant circuits respectively provided at the power transmission unit side and the power reception unit side resonate with respect to a switching frequency fs of the switching elements Q1 and Q2. The two resonant circuits respectively provided at the power transmission unit side and the power reception unit side, together with the electromagnetic coupling circuit 90, constitute the multi-resonant circuit 40. The multi-resonant circuit 40 has a specific resonant frequency fr at which the total impedance of the multi-resonant circuit 40 is minimized. As a result of the two resonant circuits resonate such that the switching frequency fs and the resonant frequency fr become closer to each other, a current that flows through each of the two resonant circuits becomes larger and output power increases. That is, as a result of the switching elements being switched on/off at the switching frequency fs that is higher than the specific resonant frequency fr of the multi-resonant circuit 40 including the power-transmission-unit-side resonant circuit, the power-reception-unit-side resonant circuit, and the electromagnetic coupling circuit and as a result of the power-transmission-unit-side resonant circuit and the power-reception-unit-side resonant circuit resonating such that the switching frequency fs becomes closer to the specific resonant frequency fr, a current input to the multi-resonant circuit becomes larger and output power increases.

That is, mutual inductance and mutual capacitance that are equivalently generated between the power transmission coil and the power reception coil constitute the electromagnetic coupling circuit 90, the power-transmission-unit-side resonant circuit and the power-reception-unit-side resonant circuit resonate with each other, and power is transferred from the power transmission unit to the power reception unit. On the other hand, energy of power that has not been transmitted from the power transmission unit, that is, reactive power, is retained as resonance energy in the power-transmission-unit-side resonant circuit. Likewise, energy that has not been supplied to an output, that is, reactive power, among energy of power received by the power reception unit is retained as resonance energy in the power-reception-unit-side resonant circuit.

In the case where the switching circuits are operated at the constant switching frequency fs, output is adjusted by modulating an on-periods ratio Da which is a ratio between conduction periods of two switching circuits, that is, by performing on-periods ratio modulation. According to the on-periods ratio modulation, output power increases as the on-periods ratio Da becomes closer to Da=1, that is, as a converter's duty ratio D which is a ratio of a conduction period of the first switching circuit S1 to the switching period becomes closer to D=0.5.

The switching control circuit 10 preferably performs the following control.

The switching control circuit 10 sets the switching frequency to be higher than the specific resonant frequency fr at which the total input impedance of the multi-resonant circuit including the power-transmission-unit-side resonant circuit, the power-reception-unit-side resonant circuit, and the electromagnetic coupling circuit 90 is minimized. This makes the multi-resonant circuit inductive at the switching frequency. For this reason, the phase of a current that flows through the equivalent inductor Lr lags behind that of a square-wave-shaped (trapezoidal-wave-shaped) alternating-current voltage generated by a power-transmission-unit-side alternating-current voltage generation circuit. As a result, the switching element Q1 can be turned on when a voltage vds1 of the switching element Q1 is 0. Similarly, the switching element Q2 can be turned on when a voltage vds2 of the switching element Q2 is 0. That is, a ZVS (zero voltage switching) operation is performed, and consequently a switching loss can be reduced by a large amount and a highly efficient operation can be performed. The zero voltage switching (ZVS) operation can be performed by appropriately setting a dead time in which both the switching elements Q1 and Q2 are in an off state. Because operation is performed at the switching frequency that is higher than the resonant frequency fr in the entire load range, the zero voltage switching (ZVS) operation can be carried out in the entire load range by appropriately setting the dead time.

The switching control circuit 10 fixes the switching frequency of the power-transmission-unit-side alternating-current voltage generation circuit and modulates a ratio between conduction periods of the switching circuit S1 including the switching element Q1 and the switching circuit S2 including the switching element Q2, that is, an on-periods ratio. In this way, the switching control circuit 10 adjusts output power obtained from a power-reception-unit-side rectifier circuit and adjusts to-be-transferred energy.

When output power supplied from the power-reception-unit-side rectifier circuit is controlled, the waveform of a current that flows through the multi-resonant circuit 40 distorts from a sine wave as the on-periods ratio Da is made to deviate from 1 by an on-periods-ratio modulation unit. In order to suppress the amount of waveform distortion from a sine wave within a predetermined value, the switching control circuit 10 sets the on-periods ratio of the switching circuits S1 and S2 relatively close to 1 and controls the switching elements Q1 and Q2 so as to change the switching frequency of the power-transmission-unit-side alternating-current voltage generation circuit. In this way, the switching control circuit 10 adjusts output power obtained from the power-reception-unit-side rectifier circuit and adjusts energy of to-be-transmitted power.

Accordingly, the on-periods ratio modulation described above and the switching-frequency-based control described above are used in combination to cause the switching frequency change in accordance with an alteration of a voltage input to the power reception unit and thus prevent the waveform of a current that flows through the multi-resonant circuit 40 from greatly distorting from a sine wave, and to modulate the on-periods ratio to cope with an alteration in the load. In this way, it is possible to adjust output power obtained from the power-reception-unit-side rectifier circuit and adjust energy of to-be-transmitted power while obtaining optimum converter characteristics which give a small amount of distortion of the waveform of resonance current from a sine wave and a small alteration of the switching frequency.

Figure 2:
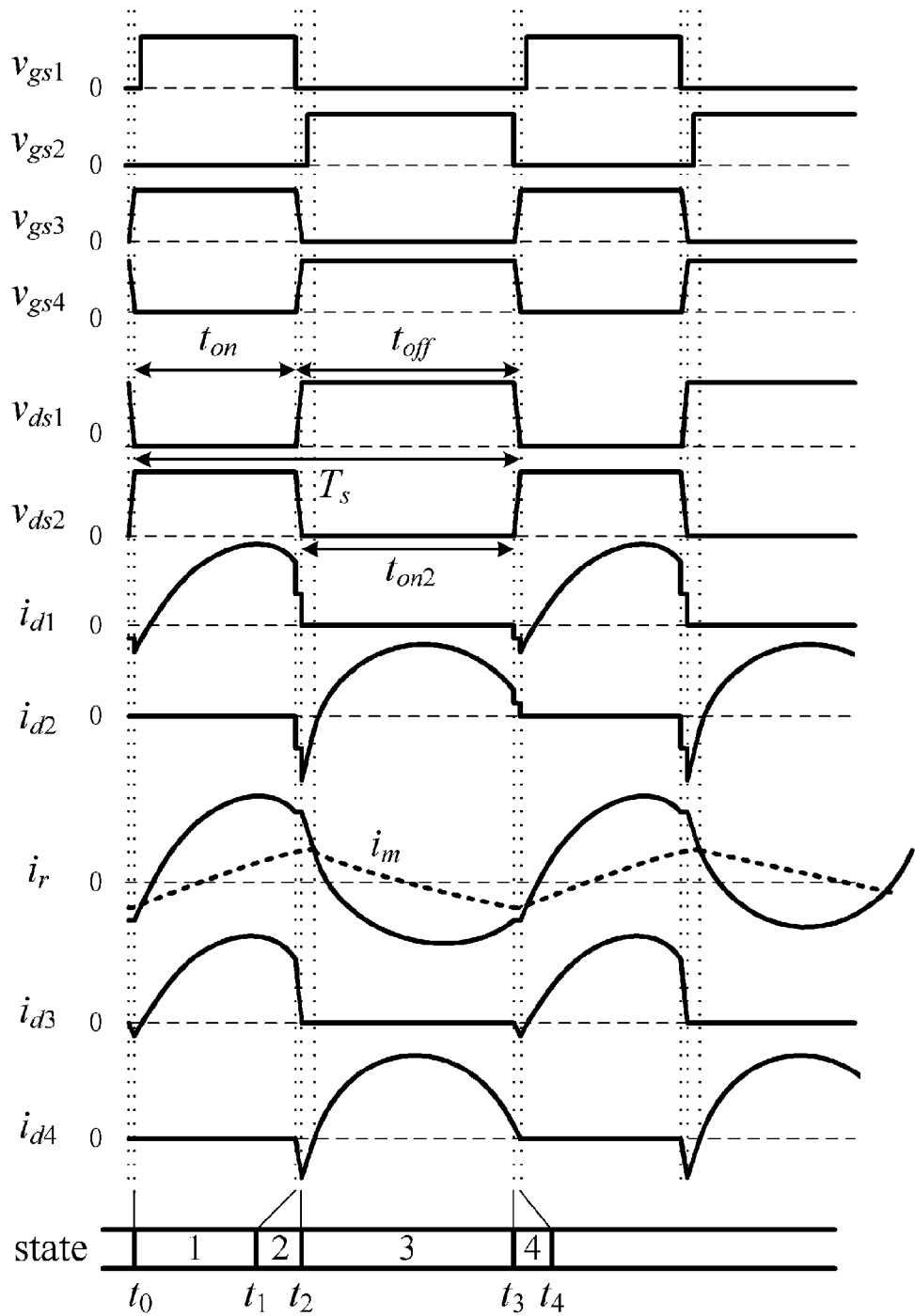
FIG. 2 is a diagram of voltage/current waveforms observed at corresponding components of the power transfer system 111 illustrated in FIG. 1.

FIG. 2 is a diagram of voltage/current waveforms observed at corresponding components of the power transfer system 111 illustrated in FIG. 1. Operation of the power transfer system 111 at each timing is as follows.

Let im denote a magnetizing current of the power transmission coil Lp. Let vgs1, vgs2, vgs3, and vgs4 denote gate-source voltages of the switching elements Q1, Q2, Q3, and Q4, respectively. Let vds1, vds2, vds3, and vds4 denote drain-source voltages of the switching elements Q1, Q2, Q3, and Q4, respectively. The switching elements Q1 and Q2 are alternately turned on/off after a short dead time during which both the switching elements are in an off state. During the dead time, the currents respectively flowing through the switching elements Q1 and Q2 are commutated, such that the ZVS operation is performed. Operation performed in each state during one switching period will be described below.

[1] State 1, Time t0 to t1

The switching circuit S1, which includes the switching element Q1, of the power transmission unit PSU is in a conductive state. First, a parasitic diode at ends of the switching element Q1 conducts. During this period, the switching element Q1 is turned on, such that the ZVS operation is performed. Consequently, a current flows through the power transmission coil Lp and the capacitor Cr is charged.

The switching circuit S3, which includes the switching element Q3, of the power reception unit PRU is in the conductive state. A voltage applied to the power transmission coil Lp induces a voltage in the power reception coil Ls and the capacitor Crs is discharged to supply a current. As a result, power equivalent to the sum of the voltage induced in the power reception coil Ls and the voltage across the capacitor Crs is transferred to the load.

Upon the switching element Q1 being turned off, the state enters State 2.

[2] State 2, Time t1 to t2

A capacitor C1 at the ends of the switching element Q1 is charged and a capacitor C2 at ends of the switching elements Q2 is discharged by a current it that had been flowing through the power transmission coil Lp. Upon the voltage vds1 becoming the voltage V1 and the voltage vds2 becoming 0 V, the state enters State 3.

[3] State 3, Time t2 to t3

The switching circuit S2, which includes the switching element Q2, of the power transmission unit PSU is in the conductive state. First, a parasitic diode at the ends of the switching element Q2 conducts. During this period, the switching element Q2 is turned on, such that the ZVS operation is performed. Consequently, a current flows through the power transmission coil Lp and the capacitor Cr is discharged. The switching element Q4 is in the conductive state. A voltage applied to the power transmission coil Lp induces a voltage in the power reception coil Ls and the capacitor Crs is charged. A voltage of the capacitor Co is applied to the load and power is transferred to the load.

Upon the switching element Q2 being turned off, the state enters State 4.

[4] State 4, Time t3 to t4

The capacitor C1 at the ends of the switching element Q1 is discharged and the capacitor C2 at the ends of the switching elements Q2 is charged by the current it that had been flowing through the power transmission coil Lp. Upon the voltage vds1 becoming 0 V and the voltage vds2 becoming the voltage V1, the state enters State 1.

Thereafter, States 1 to 4 are cyclically repeated.

Referring to FIG. 2, current waveforms id3 and id4 that flow through the switching elements Q3 and Q4 at the power reception unit side contain negative currents. The negative currents that flow through the switching elements Q3 and Q4 in this manner are currents regenerated from the load side, whereas currents to be supplied to the output have an average of currents obtained by subtracting the negative currents from positive currents of the current waveforms id3 and id4. For this reason, by changing the on-periods ratio from 1 by a small amount, the output current reduces by a large amount. That is, it becomes possible to adjust the amount of to-be-supplied power by a large amount by changing the on-periods ratio by a small amount, improving output power controllability.

Figure 3A:
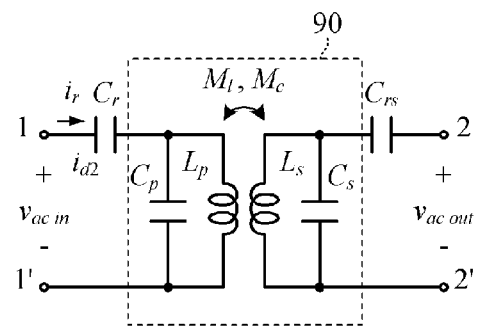
FIG. 3A is a circuit diagram of an electromagnetic coupling resonant circuit portion including an electromagnetic coupling circuit 90 and capacitors Cr and Crs that are illustrated in FIG. 1.
Figure 3B:
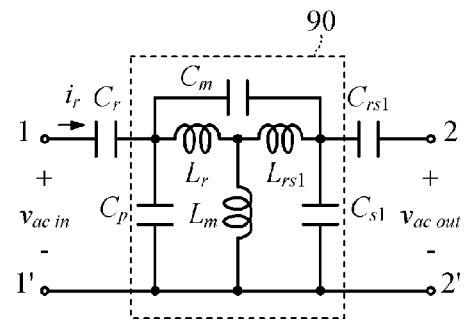
FIG. 3B is a diagram of an equivalent circuit thereof.

FIG. 3A is a circuit diagram of an electromagnetic coupling resonant circuit portion including the electromagnetic coupling circuit 90 and the capacitors Cr and Crs that are illustrated in FIG. 1. FIG. 3B is a diagram of an equivalent circuit thereof. In FIG. 3B, mutual inductance Lm is illustrated as an equivalent inductor that transfers power via magnetic coupling generated between the power transmission coil Lp and the power reception coil Ls, whereas mutual capacitance Cm is illustrated as an equivalent capacitor that transfers power via electrical coupling generated between the power transmission coil Lp and the power reception coil Ls.

The series resonant inductor Lr at the power transmission unit side provides an inductance of Lr=Lp−Lm. Also, the series resonant inductor Lrs at the power reception unit side provides an inductance of Lrs=Ls−Lm. Note that herein the inductances Ls and Lrs at the power reception unit side are described using inductances Ls1 and Lrs1 obtained by equivalently converting the inductances Ls and Lsr into apparent inductances observed from the power transmission unit side, respectively. Specifically, for example, let n be a turns ratio, which is a ratio of the number of turns of the power reception coil to the number of turns of the power transmission coil. Then, relationships expressed as:

$$Ls1 = n^2 Ls$$

$$Lrs1 = n^2 Lrs$$

hold. Likewise, herein the capacitances Cs and Csr at the power reception unit side are described using capacitances Cs1 and Crs1 obtained by equivalently converting the capacitances Cs and Crs into apparent capacitances observed from the power transmission unit side, respectively. Specifically, let n be a turns ratio, which is a ratio of the number of turns of the power reception coil to the number of turns of the power transmission coil. Then, relationships expressed as:

$$Cs1 = Cs/n^2$$

$$Crs1 = Crs/n^2$$

hold. Here, in the case where relationships expressed as:

$$Lm \ll Lp$$

$$Lm \ll Ls$$

further hold, Lr and Lrs1 can be regarded as:

$$Lr \approx Lp$$

$$Lrs1 \approx Ls1.$$

Let a voltage vac in(t) denote the waveform of a voltage input to the electromagnetic coupling resonant circuit. Then, the following expression is obtained.

[Math. 1]

$$v_{ac\ in}(t) = \begin{cases} V_i & (0 \le t < DT) \\ 0 & (DT \le t < T) \end{cases}, v_{ac\ in}(t+T) = v_{ac\ in}(t) \quad (1)$$

Here,

[Math. 2]

$$D = t_{on}/T, \omega = 2\pi/T \quad (2)$$

holds.

Figure 4:
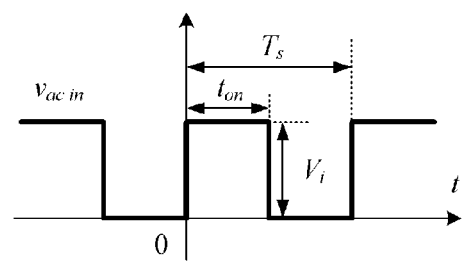
FIG. 4 is a diagram of a waveform of a voltage applied across terminals 1-1' illustrated in FIG. 3B.

The square wave voltage vac in illustrated in FIG. 4 is applied across terminals 1-1' illustrated in FIG. 3B. The following expression is obtained by applying Fourier expansion to the voltage vac in(t).

[Math. 3]

$$v_{ac\ in}(t) = DV_i + \frac{V_i}{\pi} \sum_{n=1}^{\infty} \frac{1}{n} \left\{ \sqrt{2(1-\cos(2D n\pi))} \sin(n\omega t + \alpha) \right\} \quad (3)$$

Here,

[Math. 4]

$$\alpha = \{1 - \cos(2D n\pi)\} / \sqrt{2(1-\cos(2D n\pi))} \quad (4)$$

holds.

As shown above, a square wave signal contains the fundamental component of the resonant frequency and harmonic components thereof, and a voltage containing high-order frequency components is applied across the terminals 1-1'. Thus, the electromagnetic coupling resonant circuit performs a resonance operation also for voltage waveforms of the high-order frequency components. As a result, power can be transferred efficiently. Also, energy of power that has not been transmitted from the power transmission unit, that is, reactive power, is retained as resonance energy in the power-transmission-unit-side resonant circuit. Likewise, energy that has not been supplied to the output and has not been consumed as power, that is, reactive power, among energy of power received by the power reception unit is also retained as resonance energy in the power-reception-unit-side resonant circuit.

The first preferred embodiment provides the following advantages.

Active power is transferred from the power transmission unit side to the power reception unit side using resonance in which the power-transmission-unit-side resonant circuit and the power-reception-unit-side resonant circuit resonate with each other. Reactive power is cyclically retained as resonance energy in the LC resonant circuits respectively provided at the power transmission unit side and the power reception unit side. Thus, a power transfer system with a significantly small power loss can be constructed.

By configuring a single converter as the power transmission unit PSU and the power reception unit PRU, a power transfer system with a significantly small number of power electronic components can be constructed. Thus, the structure can be significantly simplified and consequently a device implementing the power transfer system can be made smaller and lighter.

The switching operation is performed at a switching frequency that is set to be higher than the resonant frequency of the multi-resonant circuit constituted by the power transmission unit PSU and the power reception unit PRU and an appropriate dead time is set. This enables the ZVS (zero voltage switching) operation to be performed for the switching elements. As a result, a switching loss can be reduced by a large amount.

Power is transferred using resonance that occurs such that the resonant frequency of the resonant circuit constituted by the Lr and Cr at the power transmission unit side, the resonant frequency of the resonant circuit constituted by the Lrs and Crs at the power reception unit side, and the switching frequency fs are in harmony with each other. This enables a power transfer efficiency that is higher than the efficiency of electromagnetic-induction-based power transfer.

The LC resonance operation performed between the power transmission coil Lp and the power reception coil Ls enables power transfer using not only magnetic coupling but also electrical coupling. As a result, the transfer efficiency increases as compared with the case where magnetic coupling alone is used.

Information about an output from the power reception unit is delivered to the power transmission unit PSU side using the feedback control circuit 50 and the amount of to-be-transferred power is adjusted by controlling the switching control circuit 10 provided at the power transmission unit side in accordance with the information. This enables the amount of to-be-transferred power to be accurately adjusted.

Information about the output is delivered to the power transmission unit side using a wireless communication device as the signal delivering device 30. This enables the power transmission unit to adjust the amount of to-be-output power in an electrically insulated state.

Information about the output is delivered to the power transmission unit side using a photoelectric element as the signal delivering device 30. This enables the power transmission unit to adjust the amount of to-be-output power in an electrically insulated state.

PFM (Pulse Frequency Modulation) to change the switching frequency enables transfer power control. As a result, the amount of to-be-output power can be adjusted.

ORM (On-periods Ratio Modulation) to modulate a ratio between conduction periods of switching elements that are alternately turned on/off at a fixed switching frequency enables transfer power control. The use of the fixed switching frequency can limit a frequency band to be used and makes the EMC handling easier. Also, controllability of controlling the output can be improved.

The synchronous rectifier circuit provided at the power reception unit side can reduce a rectification loss. The power transfer system can be made smaller. The switching elements Q3 and Q4 that constitute the synchronous rectifier circuit perform a synchronous rectification operation so as to cause negative currents to flow through the switching elements Q3 and Q4. This makes it possible to adjust the amount of to-be-transferred power by a large amount by changing the on-periods ratio by a small amount. As a result, controllability of controlling to-be-transferred power can be improved.

By controlling the operating frequency of the synchronous rectifier circuit provided at the power reception unit side, the power reception unit can adjust the amount of to-be-transferred power instead of the power transmission unit.

The power reception unit can operate its control circuit using received power. Thus, the power reception unit need not include a power supply, and consequently the power reception unit can be made smaller and lighter.

Bidirectional power transfer makes it possible to transfer power from the power reception unit side to the power transmission unit side or to use the power transfer system as a relay system capable of transmitting received power to another unit by using the power reception unit as the relay point. As a result, long-distance power transfer can be performed by relaying power using multiple devices implementing this power transfer system.

By changing the switching frequency for the forward direction and the reverse direction, a certain place can be set for each switching frequency and consequently power can be transferred to an intended place. Changing the switching frequency can also prevent power transfer crosstalk.

By performing the ZVS operation, a switching loss caused by the switching elements can be reduced by a large amount.

The capacitors Cp and Cs that are provided in parallel with the power transmission coil Lp and the power reception coil Ls, respectively, can define an efficient electrical coupling circuit when matching is achieved therebetween through the mutual capacitance Cm generated between the power transmission coil Lp and the power reception coil Ls. As a result, transfer efficiency increases as compared with the case where magnetic coupling alone is used.

The use of a stray capacitance, which serves as equivalent capacitance resulting from electrical coupling generated between the power transmission coil Lp and the power reception coil Ls, as the mutual capacitance Cm eliminates the necessity of a component for the mutual capacitance. As a result, a device implementing the power transfer system can be made smaller and lighter.

The use of stray capacitances generated at ends of windings of the power transmission coil Lp and the power reception coil Ls as the parallel resonant capacitances (Cp and Cs), respectively, eliminates the necessity of components of parallel resonant capacitances. As a result, a device implementing the power transfer system can be made smaller and lighter.

Even in the case where the power transmission coil Lp and the power reception coil Ls have the air core, power transfer can be efficiently performed wirelessly by providing electromagnetic coupling using electromagnetic resonance. Thus, the magnetic core is no longer required and consequently the power transfer distance can be made longer.

The use of magnetizing inductance, which serves as equivalent inductance resulting from magnetic coupling generated between the power transmission coil Lp and the power reception coil Ls, can eliminate the necessity of or reduce the size of a component for the mutual inductor Lm. As a result, a device implementing the power transfer system can be made smaller and lighter.

The use of leakage inductance not involved in coupling, among the inductance component of the power transmission coil or the power reception coil, as a resonant inductor that constitutes the power-transmission-unit-side resonant circuit or the power-reception-unit-side resonant circuit can eliminate the necessity of or reduce the size of a component for the resonant inductor. As a result, a device implementing the power transfer system can be made smaller and lighter.

Other Configuration Examples of First Preferred Embodiment

Figure 5A:
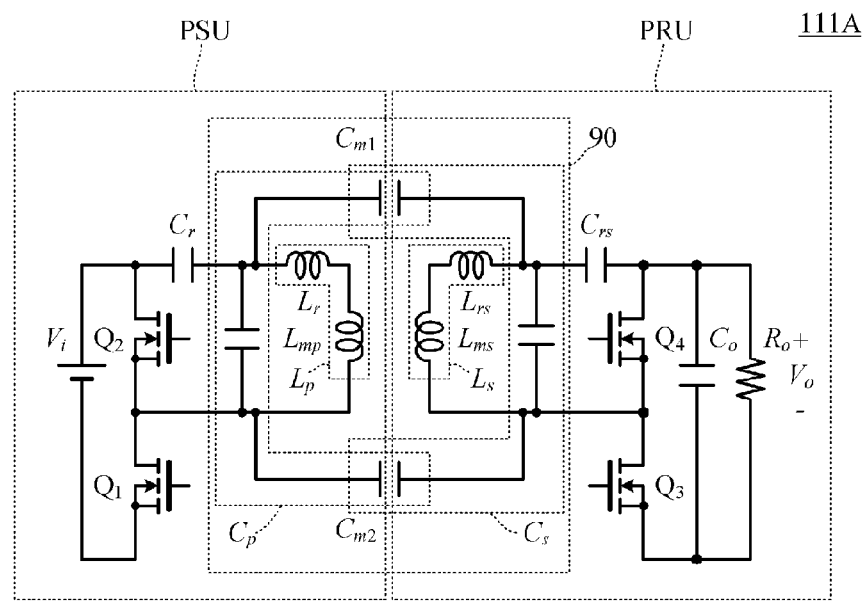
FIG. 5A is a circuit diagram of a power transfer system 111A that is another configuration example of the first preferred embodiment.
Figure 5B:
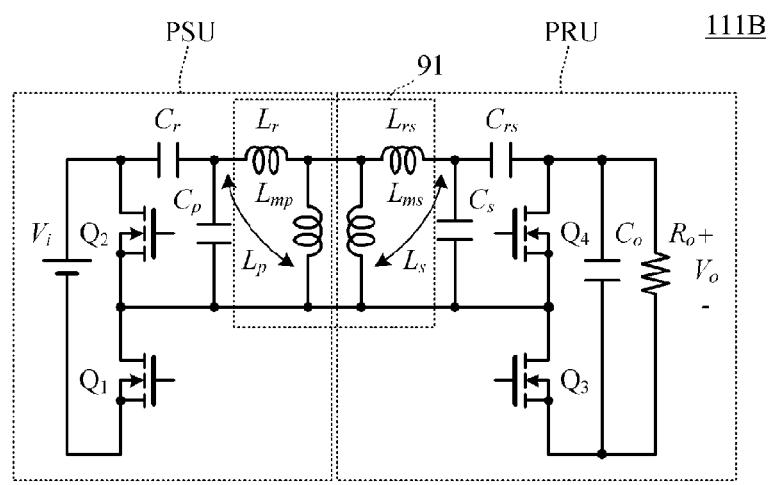
FIG. 5B is a circuit diagram of a power transfer system 111B that is another configuration example of the first preferred embodiment.
Figure 5C:
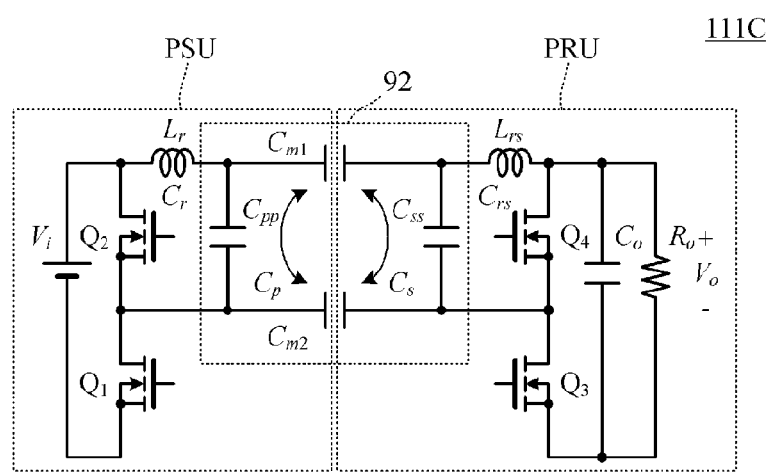
FIG. 5C is a circuit diagram of a power transfer system 111C that is another configuration example of the first preferred embodiment.

Each of FIGS. 5A, 5B, and 5C is a circuit diagram of a power transfer system that is another configuration example of the first preferred embodiment.

FIG. 5A is a circuit diagram of a power transfer system 111A. Unlike the power transfer system 111 illustrated in FIG. 1, the power transfer system 111A includes mutual inductances Lmp and Lms which are equivalent inductances involved in magnetic coupling between the power transmission coil Lp and the power reception coil Ls, and leakage inductances Lr and Lrs which are equivalent inductances not involved in the magnetic coupling. The power transfer system 111A also includes mutual capacitances Cm1 and Cm2 which are equivalent capacitances involved in electrical coupling between the power transmission capacitance Cp and the power reception capacitance Cs, and leakage capacitances Cpp and Css which are equivalent capacitances not involved in the electrical coupling. As these inductances Lmp, Lms, Lr, and Lrs and the capacitances Cm1, Cm2, Cpp, and Css, equivalent inductors of the power transmission coil Lp and the power reception coil Ls and equivalent capacitances of the power transmission capacitance Cp and the power reception capacitance Cs can be used. Alternatively, as these, discrete electronic components may be used or an equivalent inductance and an equivalent capacitance may be used in conjunction with each other.

The power transfer system 111A offers the following advantages.

The use of the magnetizing inductances Lmp and Lms, which serve as equivalent inductances resulting from magnetic coupling generated between the power transmission coil Lp and the power reception coil Ls, can eliminate the necessity of or reduce the size of a component for the mutual inductor. As a result, a device implementing the power transfer system can be made smaller and lighter.

The use of leakage inductance not involved in coupling among the inductance component of the power transmission coil Lp or the power reception coil Ls, as a resonant inductor that constitutes the power-transmission-unit-side resonant circuit or the power-reception-unit-side resonant circuit can eliminate the necessity of or reduce the size of a component for the resonant inductor. As a result, a device implementing the power transfer system can be made smaller and lighter.

The use of the magnetizing capacitances Cm1 and Cm2, which serve as equivalent capacitances resulting from electrical coupling generated between the power transmission capacitance Cp and the power reception capacitance Cs, can eliminate the necessity of or reduce the size of a component for the mutual inductor. As a result, a device implementing the power transfer system can be made smaller and lighter.

The use of leakage capacitance not involved in coupling among the capacitance component of the power transmission capacitance Cp or the power reception capacitance Cs, as a resonant capacitor that constitutes the power-transmission-unit-side resonant circuit or the power-reception-unit-side resonant circuit can eliminate the necessity of or reduce the size of a component for the resonant capacitor. As a result, a device implementing the power transfer system can be made smaller and lighter.

FIG. 5B is a circuit diagram of a power transfer system 111B. Unlike the power transfer system 111 illustrated in FIG. 1 in the first preferred embodiment, the power transfer system 111B includes mutual inductances Lmp and Lms which are equivalent inductances involved in magnetic coupling between the power transmission coil Lp and the power reception coil Ls, and leakage inductances Lr and Lrs which are equivalent inductances not involved in the magnetic coupling. The power transfer system 111B does not include any mutual capacitance which is an equivalent capacitance involved in electrical coupling. That is, only a magnetic coupling circuit in which coupling is achieved only in the magnetic field is generated instead of an electromagnetic coupling circuit in which coupling is achieved in the electric and magnetic fields.

Because a magnetic coupling circuit 91 is included in the power transfer system 111B, a simple circuit with a smaller number of components than that of the electrical coupling circuit 90 can be constructed. The power transfer system 111B offers the following advantages.

The use of the magnetizing inductances Lmp and Lms, which serve as equivalent inductances resulting from magnetic coupling generated between the power transmission coil Lp and the power reception coil Ls, can eliminate the necessity of or reduce the size of a component for the mutual inductor. As a result, a device implementing the power transfer system can be made smaller and lighter.

The use of leakage inductance not involved in coupling among the inductance component of the power transmission coil Lp or the power reception coil Ls, as a resonant inductor that constitutes the power-transmission-unit-side resonant circuit or the power-reception-unit-side resonant circuit can eliminate the necessity of or reduce the size of a component for the resonant inductor. As a result, a device implementing the power transfer system can be made smaller and lighter.

FIG. 5C is a circuit diagram of a power transfer system 111C. Unlike the power transfer system 111 illustrated in FIG. 1 in the first preferred embodiment, the power transfer system 111C includes mutual capacitances Cm1 and Cm2 which are equivalent capacitances involved in electrical coupling between the power transmission capacitance Cp and the power reception capacitance Cs, and leakage capacitances Cpp and Css which are equivalent capacitances not involved in magnetic coupling. The power transfer system 111C does not include any mutual inductance which is an equivalent inductance involved in electrical coupling. That is, only an electrical coupling circuit 92 in which coupling is achieved only in the electric field is generated instead of the electrical coupling circuit 90 in which coupling is achieved in the electric and magnetic fields.

Because the electrical coupling circuit 92 is included in the power transfer system 111C, a simple circuit with a smaller number of components than that of the electrical coupling circuit can be constructed. The power transfer system 111C offers the following advantages.

The use of the magnetizing capacitances Cm1 and Cm2, which serve as equivalent capacitances resulting from electrical coupling generated between the power transmission capacitance Cp and the power reception capacitance Cs, can eliminate the necessity of or reduce the size of a component for the mutual inductor. As a result, a device implementing the power transfer system can be made smaller and lighter.

The use of leakage capacitance not involved in coupling among the capacitance component of the power transmission capacitance Cp or the power reception capacitance Cs, as a resonant capacitor that constitutes the power-transmission-unit-side resonant circuit or the power-reception-unit-side resonant circuit can eliminate the necessity of or reduce the size of a component for the resonant capacitor. As a result, a device implementing the power transfer system can be made smaller and lighter.

Second Preferred Embodiment

Figure 6:
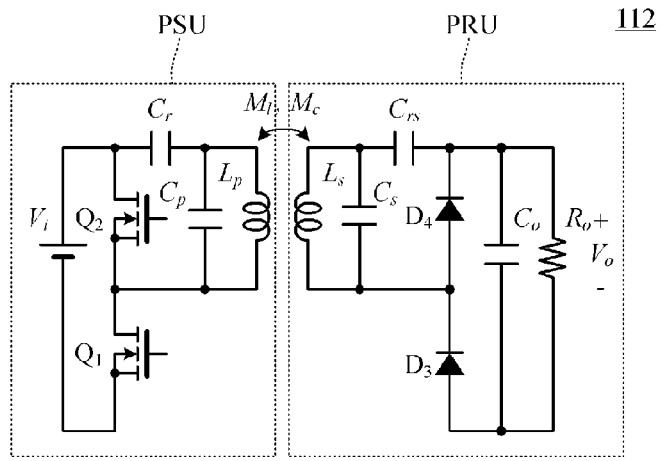
FIG. 6 is a circuit diagram of a power transfer system 112 according to a second preferred embodiment of the present invention.

FIG. 6 is a circuit diagram of a power transfer system 112 according to a second preferred embodiment. In this example, unlike the power transfer system 111 according to the first preferred embodiment, the power reception unit preferably includes rectifier diodes D3 and D4 instead of the switching elements Q3 and Q4 which serve as synchronous rectifier elements. That is, the diodes D3 and D4 constitute the power-reception-unit-side rectifier circuit.

Figure 7:
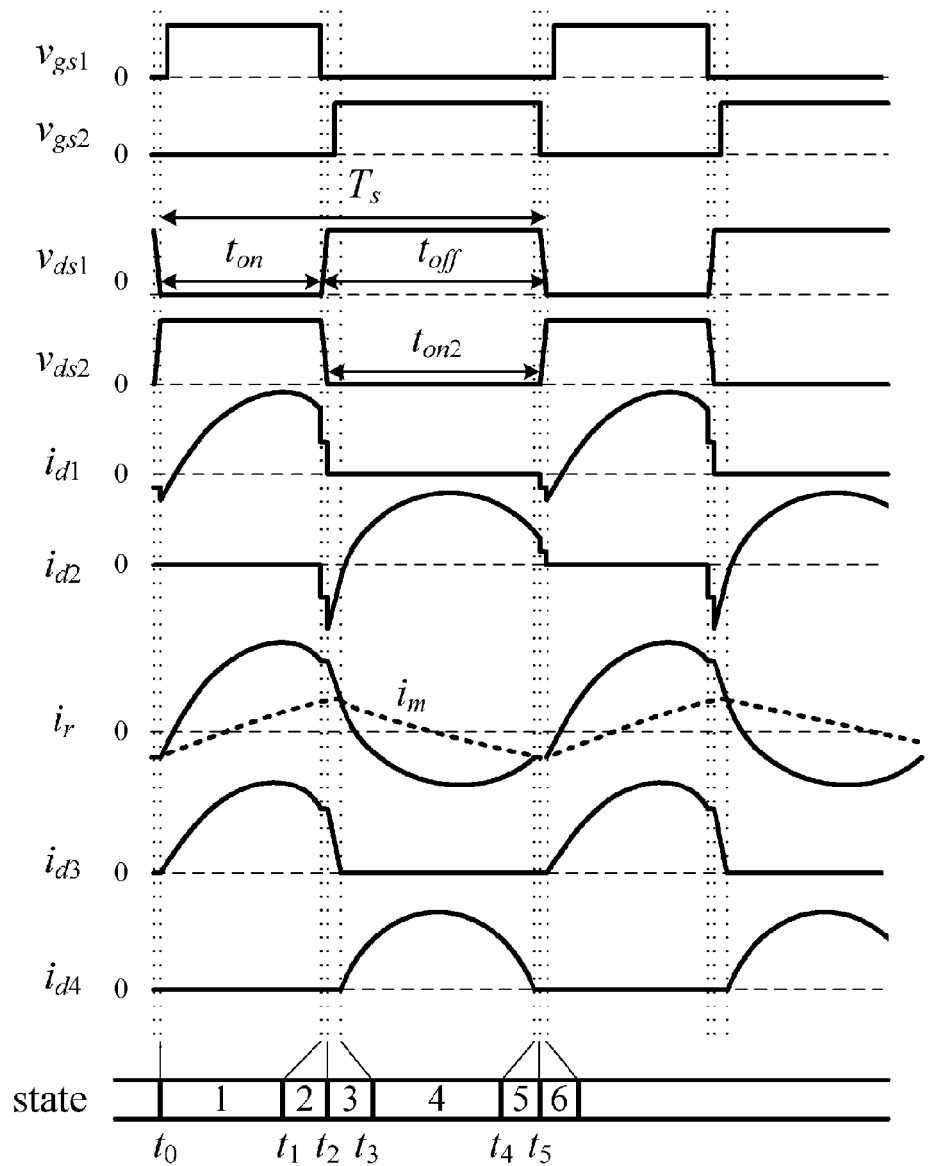
FIG. 7 is a diagram of voltage/current waveforms observed at corresponding components of the power transfer system 112 illustrated in FIG. 6.

FIG. 7 is a diagram of voltage/current waveforms observed at corresponding components of the power transfer system 112 illustrated in FIG. 6. Operation of the power transfer system 112 at each timing is as follows.

Let im denote a magnetizing current of the power transmission coil Lp. Let vgs1 and vgs2 denote gate-source voltages of the switching elements Q1 and Q2, respectively. Let vds1 and vds2 denote drain-source voltages of the switching elements Q1 and Q2, respectively. The switching elements Q1 and Q2 are alternately turned on/off after a short dead time during which both the switching elements are in the off state. During the dead time, the currents respectively flowing through the switching elements Q1 and Q2 are commutated, such that the ZVS operation is performed. Operation performed in each state during one switching period will be described below.

[1] State 1, Time t0 to t1

The switching element Q1 is in the conductive state at the power transmission unit PSU side. First, a parasitic diode at ends of the switching element Q1 conducts. During this period, the switching element Q1 is turned on, such that the ZVS operation is performed. Consequently, a current flows through the power transmission coil Lp and the capacitor Cr is charged.

At the power reception unit PRU side, the diode D3 conducts and a current starts to flow from 0 A. A voltage applied to the power transmission coil Lp induces a voltage in the power reception coil Ls and the capacitor Crs is discharged to supply a current. As a result, power equivalent to the sum of the voltage induced in the power reception coil Ls and the voltage across the capacitor Crs is transferred to the load.

Upon the switching element Q1 being turned off, the state enters State 2.

[2] State 2, Time t1 to t2

A capacitor C1 at the ends of the switching element Q1 is charged and a capacitor C2 at ends of the switching elements Q2 is discharged by a current it that had been flowing through the power transmission coil Lp. Upon the voltage vds1 becoming the voltage V1 and the voltage vds2 becoming 0 V, the state enters State 3.

[3] State 3, Time t2 to t3

The switching element Q2 is in the conductive state at the power transmission unit PSU side. First, a parasitic diode at the ends of the switching element Q2 conducts. During this period, the switching element Q2 is turned on, such that the ZVS operation is performed. Consequently, a current flows through the power transmission coil Lp and the capacitor Cr is discharged. Upon the current ir becoming equal to the magnetizing current im, the state enters State 4.

[4] State 4, Time t3 to t4

At the power reception unit PRU side, the diode D4 conducts and a current starts to flow from 0 A. A voltage applied to the power transmission coil Lp induces a voltage in the power reception coil Ls and the capacitor Crs is charged. A voltage of the capacitor Co is applied to the load and power is transferred to the load. Upon the current ir becoming equal to the magnetizing current im, the state enters State 5.

[5] State 5, Time t4 to t5

At the power transmission unit PSU side, the current ir flows as the magnetizing current im. At the power reception unit PRU side, no current flows. Upon the switching element Q2 being turned off, the state enters State 6.

[6] State 6, Time t5 to t6

The capacitor C1 at the ends of the switching element Q1 is discharged and the capacitor C2 at the ends of the switching element Q2 is charged by the current ir that had been flowing through the power transmission coil Lp. Upon the voltage vds1 becoming 0 V and the voltage vds2 becoming the voltage V1, the state enters State 1.

Thereafter, States 1 to 6 are cyclically repeated.

In the power transfer system 112 according to the second preferred embodiment, the configuration of the power reception unit PRU can be simplified. Also, the rectifier diodes D3 and D4 let current flow only in the forward direction. Thus, no negative current flows through the power-reception-unit-side rectifier circuit in contrast to the power transfer system 111 according to the first preferred embodiment. For this reason, there is no current regenerated from the output side and the amount of current that circulates in the power-reception-unit-side resonant circuit reduces. As a result, a conduction loss can be reduced.

Third Preferred Embodiment

Figure 8:
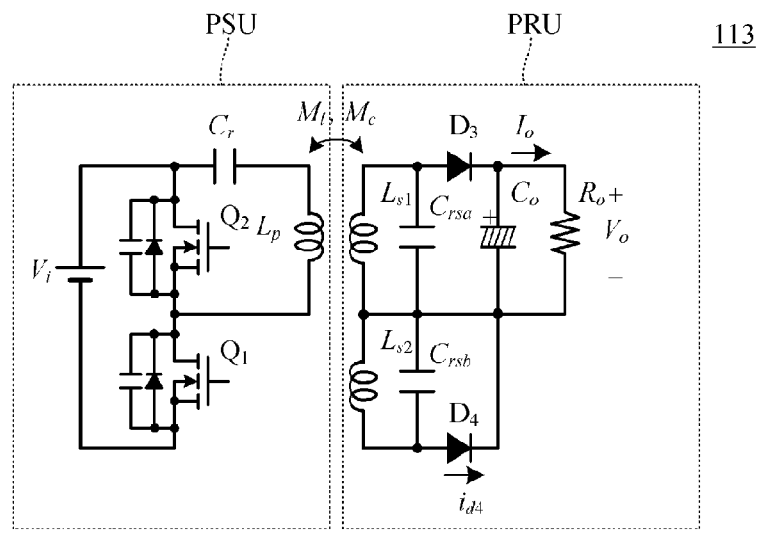
FIG. 8 is a circuit diagram of a power transfer system 113 according to a third preferred embodiment of the present invention.

FIG. 8 is a circuit diagram of a power transfer system 113 according to a third preferred embodiment. A difference from the power transfer system illustrated in FIG. 1 in the first preferred embodiment is the configuration of the power reception unit PRU. In the third preferred embodiment, power reception coils Ls1 and Ls2, diodes D3 and D4, and a capacitor Co constitute a center-tap rectifier circuit. The configuration of the power transmission unit PSU is similar to that illustrated in the first preferred embodiment. However, at the power transmission unit PSU side, a parallel resonant capacitor Crsa (which is a capacitor equivalent to Cp in FIG. 1) is constituted by stray capacitance produced in the power transmission coil Lp or a discrete capacitor.

In this third preferred embodiment, at the power reception unit PRU side, a parallel resonant capacitor Crsb (which is a capacitor equivalent to Cs in FIG. 1) is constituted by stray capacitance produced in the power reception coils Ls1 and Ls2 or a discrete capacitor.

In the power transfer system 113 according to the third preferred embodiment, to-be-transferred power is controlled by performing switching frequency modulation (PFM).

Fourth Preferred Embodiment

Figure 9:
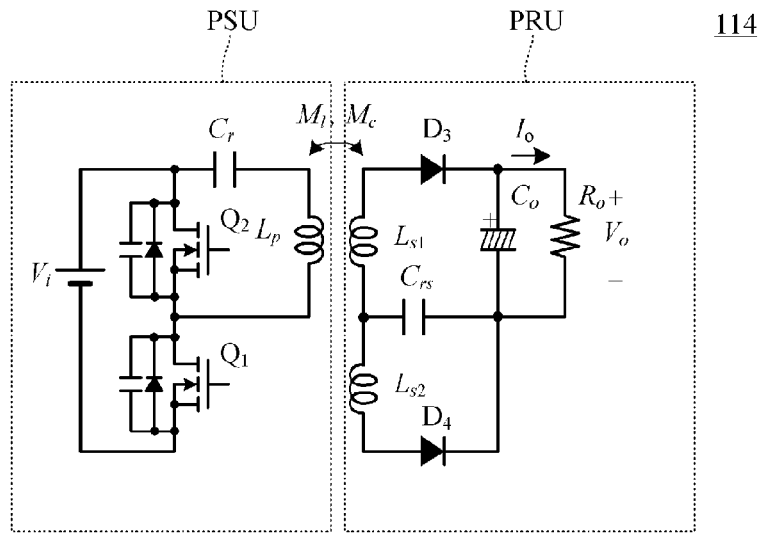
FIG. 9 is a circuit diagram of a power transfer system 114 according to a fourth preferred embodiment of the present invention.

FIG. 9 is a circuit diagram of a power transfer system 114 according to a fourth preferred embodiment. In this example, unlike the power transfer system illustrated in FIG. 7 in the third preferred embodiment, the power reception unit PRU includes a resonant capacitor Crs. This capacitor Crs allows electromagnetic resonance operation to be performed at a certain resonant frequency.

In the power transfer system 114 according to the fourth preferred embodiment, to-be-transferred power is controlled by performing switching frequency modulation (PFM).

Fifth Preferred Embodiment

Figure 10:
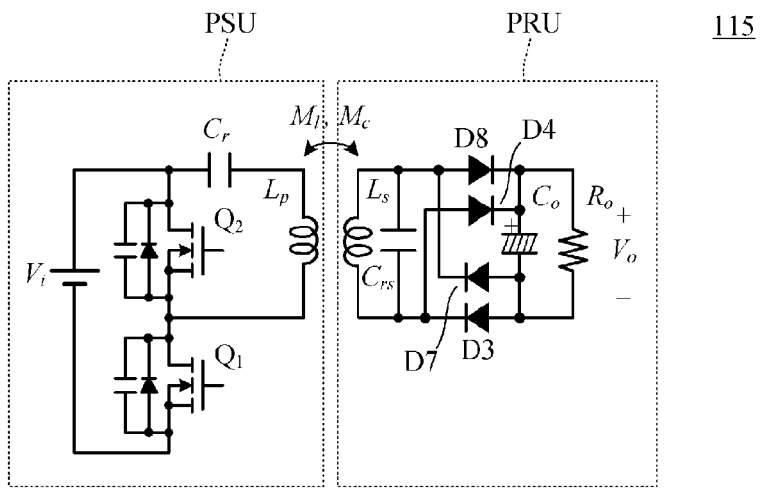
FIG. 10 is a circuit diagram of a power transfer system 115 according to a fifth preferred embodiment of the present invention.

FIG. 10 is a circuit diagram of a power transfer system 115 according to a fifth preferred embodiment. A difference from the power transfer system illustrated in FIG. 1 in the first preferred embodiment is the configuration of the power reception unit PRU. In the fifth preferred embodiment, a power reception coil Ls, diodes D3, D4, D7, and D8, and a capacitor Co constitute a bridge rectifier circuit. The configuration of the power transmission unit PSU is similar to that illustrated in the first preferred embodiment.

At the power reception unit PRU side, a parallel resonant capacitor Crs (which is a capacitor equivalent to Cs in FIG. 1) is constituted by stray capacitance produced in the power transmission coil Ls or a discrete capacitor.

In the power transfer system 115 according to the fifth preferred embodiment, to-be-transferred power is controlled by performing switching frequency modulation (PFM).

Sixth Preferred Embodiment

Figure 11:
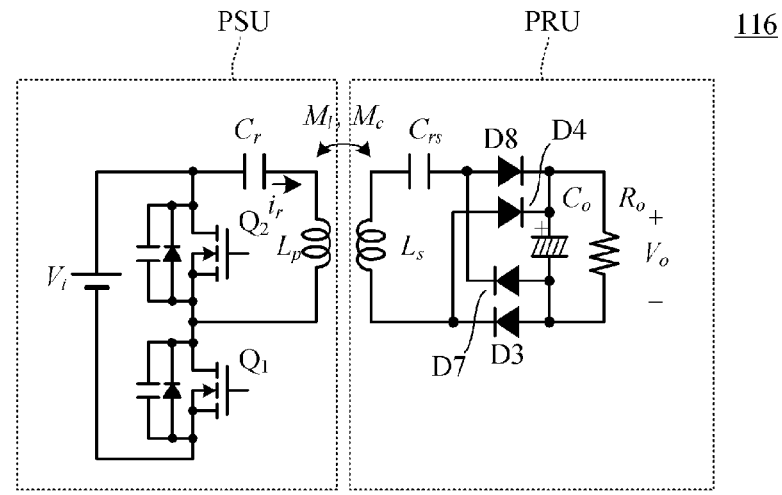
FIG. 11 is a circuit diagram of a power transfer system 116 according to a sixth preferred embodiment of the present invention.

FIG. 11 is a circuit diagram of a power transfer system 116 according to a sixth preferred embodiment. In this example, unlike the power transfer system illustrated in FIG. 10 in the fifth preferred embodiment, the power reception unit PRU includes a resonant capacitor Crs. This capacitor Crs allows electromagnetic resonance operation to be performed at a certain resonant frequency.

In the power transfer system 116 according to the sixth preferred embodiment, to-be-transferred power is controlled by performing switching frequency modulation (PFM).

Seventh Preferred Embodiment

Figure 12:
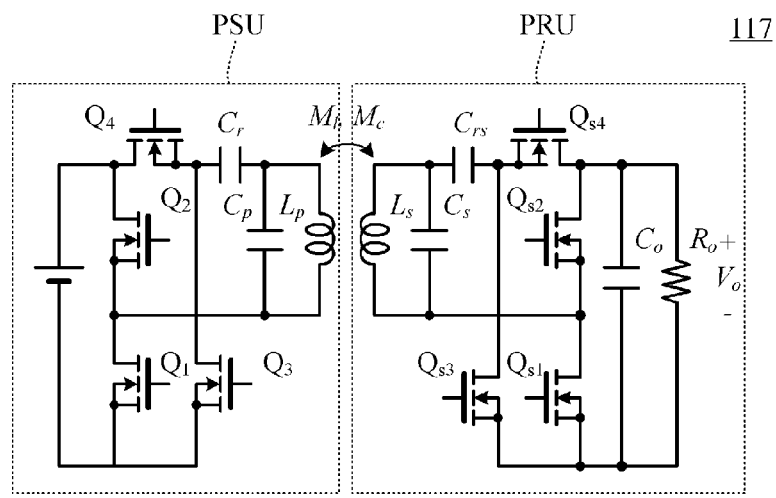
FIG. 12 is a circuit diagram of a power transfer system 117 according to a seventh preferred embodiment of the present invention.

FIG. 12 is a circuit diagram of a power transfer system 117 according to a seventh preferred embodiment. In this example, the power transmission unit PSU includes an alternating-current voltage generation circuit which is configured as a full-bridge circuit constituted by four switching elements Q1, Q2, Q3, and Q4. Also, the power reception unit PRU includes a rectifier circuit which is configured as a bridge rectifier constituted by four switching elements Qs1, Qs2, Qs3, and Qs4.

According to this seventh preferred embodiment, voltages applied to the switching elements Q1, Q2, Q3, and Q4 at the power transmission unit PSU side and to the switching elements Qs1, Qs2, Qs3, and Qs4 at the power reception unit PRU side are half the voltages used in the first to sixth preferred embodiments. Thus, a loss caused by the switching elements can be reduced.

Also, the power transmission unit PSU and the power reception unit PRU have the similar circuit configurations and thus are symmetric. As a result, the power transmission unit PSU and the power reception unit PRU can be used as devices of a bidirectional power transfer system.

Eighth Preferred Embodiment

Figure 13:
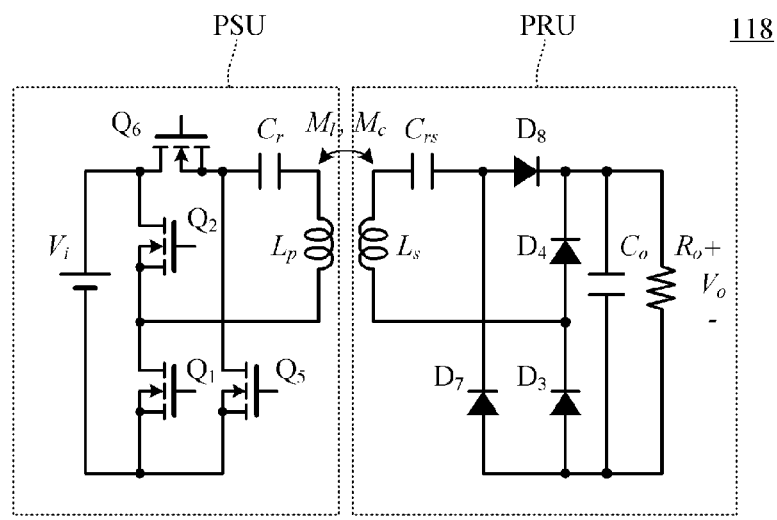
FIG. 13 is a circuit diagram of a power transfer system 118 according to an eighth preferred embodiment of the present invention.

FIG. 13 is a circuit diagram of a power transfer system 118 according to an eighth preferred embodiment. In this example, the power transmission unit PSU includes an alternating-current voltage generation circuit which is configured as a full-bridge circuit constituted by four switching elements Q1, Q2, Q5, and Q6. Also, the power reception unit PRU includes a rectifier circuit which is configured as a bridge rectifier constituted by four diodes D3, D4, D7, and D8.

According to the eighth preferred embodiment, the configuration of the power reception unit PRU can be simplified as compared with that of the seventh preferred embodiment. Also, the breakdown voltage of each rectifier element provided at the power reception unit PRU side can be lowered.

Ninth Preferred Embodiment

Figure 14:
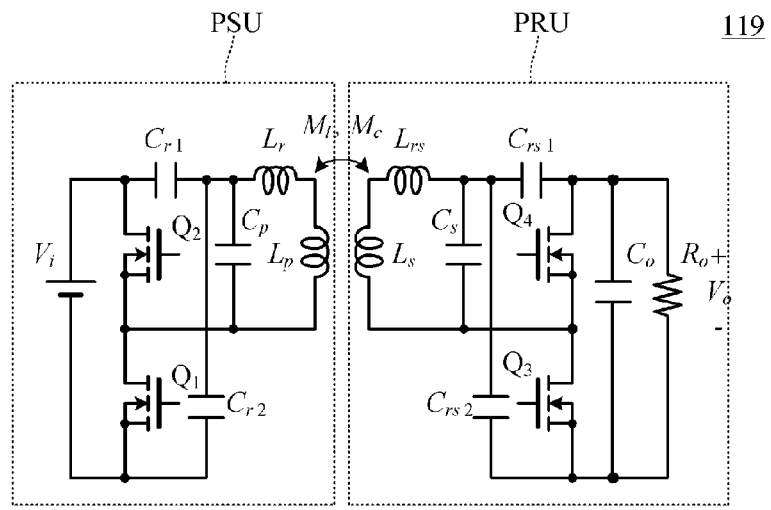
FIG. 14 is a circuit diagram of a power transfer system 119 according to a ninth preferred embodiment of the present invention.

FIG. 14 is a circuit diagram of a power transfer system 119 according to a ninth preferred embodiment.

In this example, the power transfer system 119 includes capacitors Cr1 and Cr2 that divide a voltage supplied from the input power supply Vi and capacitors Crs1 and Crs2 that divide the output voltage V0. Specifically, the series resonant capacitor Cr included in the power transfer system described in the first preferred embodiment is divided into the capacitors Cr1 and Cr2, whereas the series resonant capacitor Crs is divided into the capacitors Crs1 and Crs2. In this figure, magnetizing inductances of the power transmission coil Lp and the power reception coil Ls are illustrated as series resonant inductors Lr and Lrs, respectively. The other configuration is similar to the one illustrated in FIG. 1 in the first preferred embodiment.

In the ninth preferred embodiment, because a current that flows through the series resonant capacitor is divided by the two capacitors, a loss caused by the capacitor is distributed, the overall loss is reduced, and generated heat is distributed.

Note that the capacitors Cr1 and Cr2 and the capacitors Crs1 and Crs2 have both a function of holding a direct-current voltage and a function of a series resonant capacitor.

Tenth Preferred Embodiment

Figure 15:
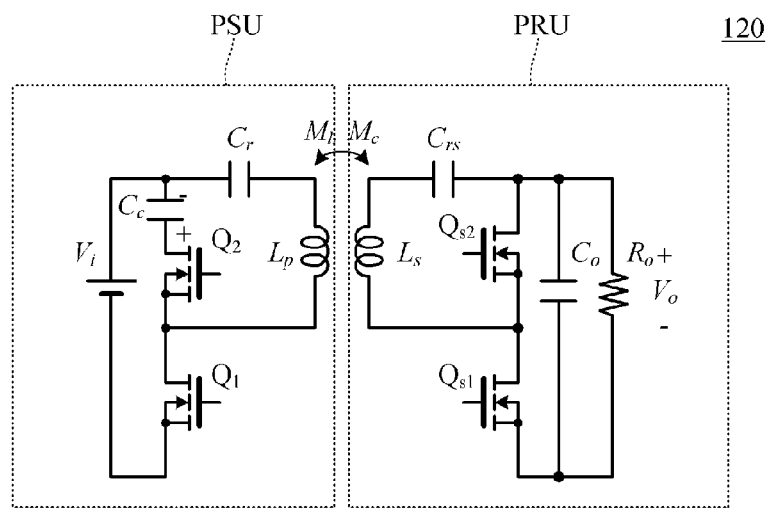
FIG. 15 is a circuit diagram of a power transfer system 120 according to a tenth preferred embodiment of the present invention.

FIG. 15 is a circuit diagram of a power transfer system 120 according to a tenth preferred embodiment. In this example, the power transmission unit PSU includes a capacitor Cc, which constitutes a voltage clamp circuit. The other configuration is similar to the one illustrated in FIG. 1 in the first preferred embodiment.

In the power transfer system illustrated in FIG. 15, after the switching element Q1 is turned off, a voltage of the power transmission coil Lp, that is, a voltage in a direction illustrated in FIG. 15, is charged in the capacitor Cc via the parasitic diode of the switching element Q2. When the switching element Q2 is in the on state, the voltage (+Vc) charged in the capacitor Cc is applied to the multi-resonant circuit. That is, the input voltage V1 is converted into a square-wave voltage, which has a voltage swing between +Vi and −Vc.

In the first to ninth preferred embodiments, the voltage fed from the input power supply to the resonant circuit changes between +Vi and 0 V and has a voltage magnitude of Vi. In contrast, in the tenth preferred embodiment, the voltage fed from the input power supply greatly changes between +Vi and −Vc and has a voltage magnitude of (Vi+Vc), at which operation is performed. Also, a voltage Vc across the capacitor Cc that constitutes the voltage clamp circuit changes depending on the duty ratio D which is a ratio of the conduction period of the switching element Q1 to the switching period. The output voltage V0 can be controlled in a wide range. This indicates that the tenth preferred embodiment is suitably applied to a case where the voltage fed from the input power supply changes in a wide range when the output voltage is kept constant. Configuring the voltage clamp circuit in this manner improves the control characteristic against a change in the input voltage. That is, the output voltage is stabilized even when the input voltage greatly changes.

According to the tenth preferred embodiment, the magnitude of the square-wave voltage fed to the resonant circuit becomes large, enabling both operations based on PFM and ORM (On-periods Ratio Modulation).

Eleventh Preferred Embodiment

Figure 16:
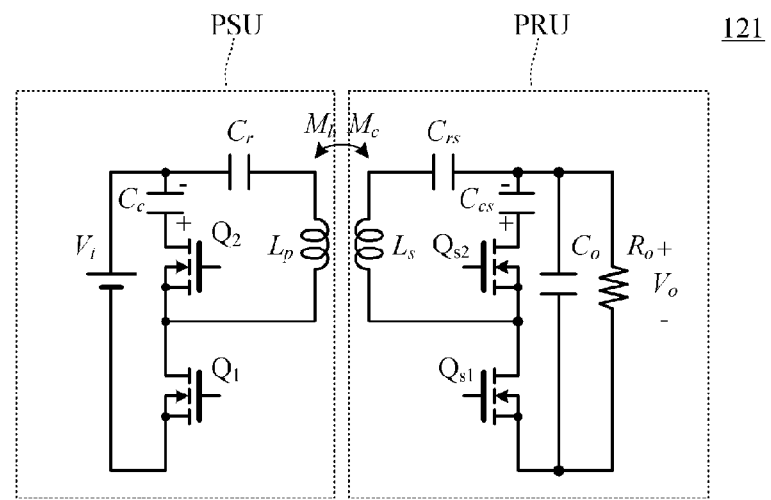
FIG. 16 is a circuit diagram of a power transfer system 121 according to an eleventh preferred embodiment of the present invention.

FIG. 16 is a circuit diagram of a power transfer system 121 according to an eleventh preferred embodiment. In this example, the power transmission unit PSU includes a capacitor Cc which constitutes a voltage clamp circuit, and the power reception unit PRU includes a capacitor Ccs which constitutes a voltage clamp circuit at the power reception unit PRU side. The other configuration is similar to the one illustrated in FIG. 15 in the tenth preferred embodiment.

In the power transfer system illustrated in FIG. 16, the input voltage V1 is converted into a square-wave voltage, which has a voltage swing between +Vi and −Vc. Also, because a negative voltage (Vcs) is charged in the capacitor Ccs provided at the power reception unit side, a square-wave alternating-current voltage applied to the synchronous rectifier circuit constituted by the switching elements Qs1 and Qs2 has a voltage swing between +Vo and −Vcs. Because the voltage swing becomes larger in this manner, the control characteristic against a change in the output voltage is improved. That is, it becomes easier to adjust the output voltage in a wide range.

Twelfth Preferred Embodiment

Figure 17:
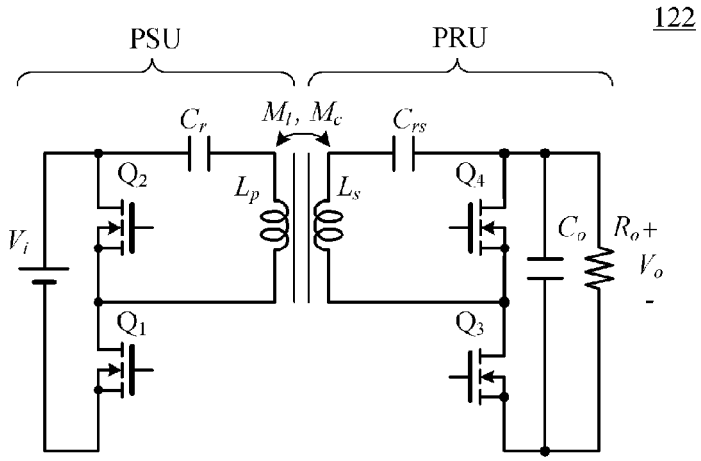
FIG. 17 is a circuit diagram of a power transfer system 122 according to a twelfth preferred embodiment of the present invention.

FIG. 17 is a circuit diagram of a power transfer system 122 according to a twelfth preferred embodiment. In this example, the power transmission coil Lp of the power transmission unit PSU and the power reception coil Ls of the power reception unit PRU each have a ferrite core or the like. Accordingly, the power transmission coil Lp and the power reception coil Ls constitute a transformer.

According to the twelfth preferred embodiment, the degree of magnetic coupling between the power transmission coil Lp and the power reception coil Ls increases, which can make the power transfer efficiency sufficiently large. Also, electromagnetic waves (magnetic flux and electric flux) radiated to space can be suppressed by the ferrite core.

Thirteenth Preferred Embodiment

Figure 18:
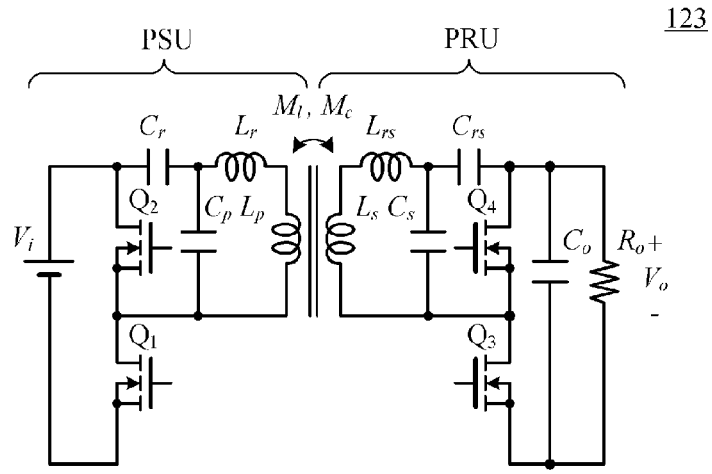
FIG. 18 is a circuit diagram of a power transfer system 123 according to a thirteenth preferred embodiment of the present invention.

FIG. 18 is a circuit diagram of a power transfer system 123 according to a thirteenth preferred embodiment. This power transfer system 123 includes resonant inductors Lr and Lrs and resonant capacitors Cr, Crs, Cp, and Cs as compared with the twelfth preferred embodiment.

According to the thirteenth preferred embodiment, the degree of magnetic coupling between the power transmission coil Lp and the power reception coil Ls increases, which can make the power transfer efficiency sufficiently large. Also, because most magnetic flux produced by mutual inductance involved in magnetic coupling between the power transmission coil Lp and the power reception coil Ls passes through the ferrite core, electromagnetic waves (magnetic flux and electric flux) radiated to space can be suppressed by the ferrite. Also, leakage inductances which are inductance components not involved in magnetic coupling between the power transmission coil Lp and the power reception coil Ls can be used as the resonant inductors Lr and Lrs. Moreover, winding capacitances which are stray capacitances equivalently produced in the power transmission coil Lp and the power reception coil Ls can be used as the resonant capacitors Cp and Cs. Alternatively, these resonant inductors Lr and Lrs and the resonant capacitors Cp and Cs each can be configured as a discrete electronic component. In this case, because resonant frequencies can be set to intended values, it becomes easier to cause resonance at a certain switching frequency.

Fourteenth Preferred Embodiment

Figure 19:
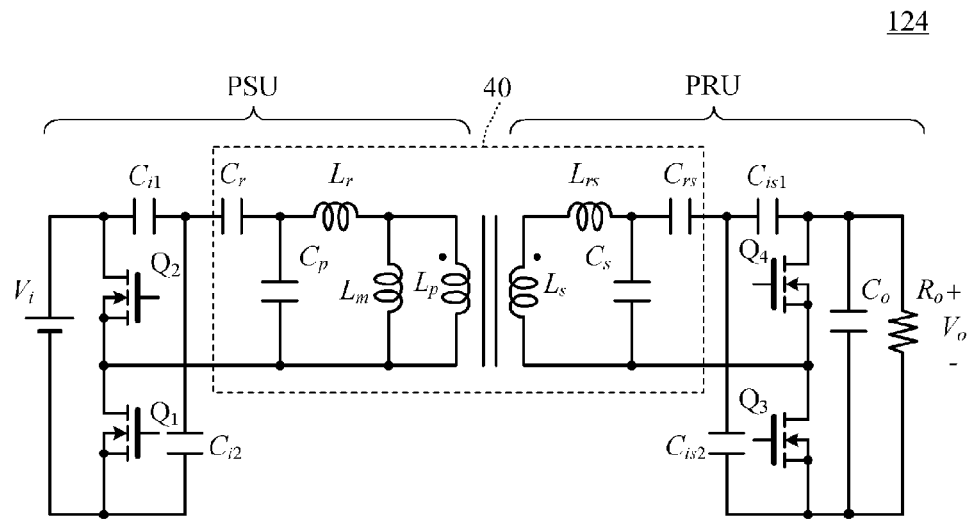
FIG. 19 is a circuit diagram of a power transfer system 124 according to a fourteenth preferred embodiment of the present invention.

FIG. 19 is a circuit diagram of a power transfer system 124 according to a fourteenth preferred embodiment. This power transfer system 124 includes resonant inductors Lr and Lrs and resonant capacitors Cr, Crs, Cp, and Cs as compared with the twelfth preferred embodiment. The power transmission coil Lp, the power reception coil Ls, the resonant inductors Lr and Lrs, and the resonant capacitors Cr, Crs, Cp, and Cs constitute the multi-resonant circuit 40.

According to the fourteenth preferred embodiment, the degree of magnetic coupling between the power transmission coil Lp and the power reception coil Ls increases, which can make the power transfer efficiency sufficiently large. Also, electromagnetic waves (magnetic flux and electric flux) radiated to space can be suppressed by the ferrite. Moreover, because resonant frequencies can be set to intended values, it becomes easier to cause resonance.

Fifteenth Preferred Embodiment

Figure 20:
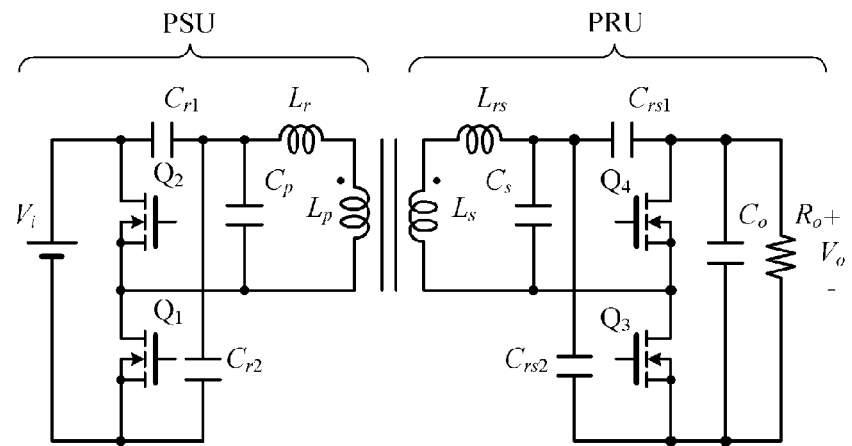
FIG. 20 is a circuit diagram of a power transfer system 125 according to a fifteenth preferred embodiment of the present invention.

FIG. 20 is a circuit diagram of a power transfer system 125 according to a fifteenth preferred embodiment. This power transfer system 125 includes capacitors Cr1 and Cr2 that divide a voltage supplied from the input power supply Vi and capacitors Crs1 and Crs2 that divide the output voltage V0. Specifically, the series resonant capacitor provided at the power transmission unit PSU side is divided into the capacitors Cr1 and Cr2, whereas the series resonant capacitor provided at the power reception unit PRU side is divided into the capacitors Crs1 and Crs2.

In the fifteenth preferred embodiment, because a current that flows through the series resonant capacitor is divided by the two capacitors, a loss caused by the capacitor is distributed, the overall loss is reduced, and generated heat is distributed.

Note that the capacitors Cr1 and Cr2 and the capacitors Crs1 and Crs2 have both a function of holding a direct-current voltage and a function of a series resonant capacitor.

Sixteenth Preferred Embodiment

Figure 21:
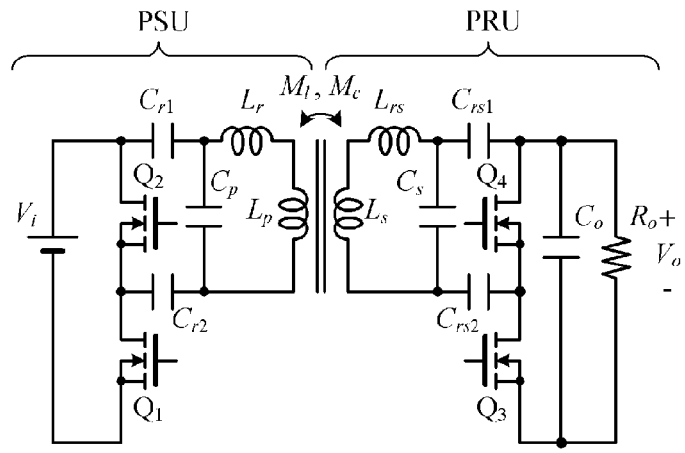
FIG. 21 is a circuit diagram of a power transfer system 126 according to a sixteenth preferred embodiment of the present invention.

FIG. 21 is a circuit diagram of a power transfer system according to a sixteenth preferred embodiment. In this example, the resonant capacitor provided at the power transmission unit PSU side is provided as two capacitors Cr1 and Cr2, whereas the resonant capacitor provided at the power reception unit side is provided as two capacitors Crs1 and Crs2. The capacitors Cr1 and Cr2 and the capacitors Crs1 and Crs2 have both a function of holding a direct-current voltage and a function of a series resonant capacitor.

According to this sixteenth preferred embodiment, the resonant capacitors Cr1, Cr2, Crs1, and Crs2 can provide electrical insulation via the electric field. Also, by surrounding the power transmission coil and the power reception coil by the resonant capacitors Cr1, Cr2, Crs1, and Crs2, physical restraints are relaxed and it becomes easier to suppress electromagnetic waves (magnetic flux and electric flux) radiated to space.

Moreover, because a voltage applied to each of the resonant capacitors at the power transmission unit PSU side and the power reception unit PRU side is divided and applied to the two capacitors, a loss caused by the capacitor can be distributed.

Seventeenth Preferred Embodiment

Figure 22:
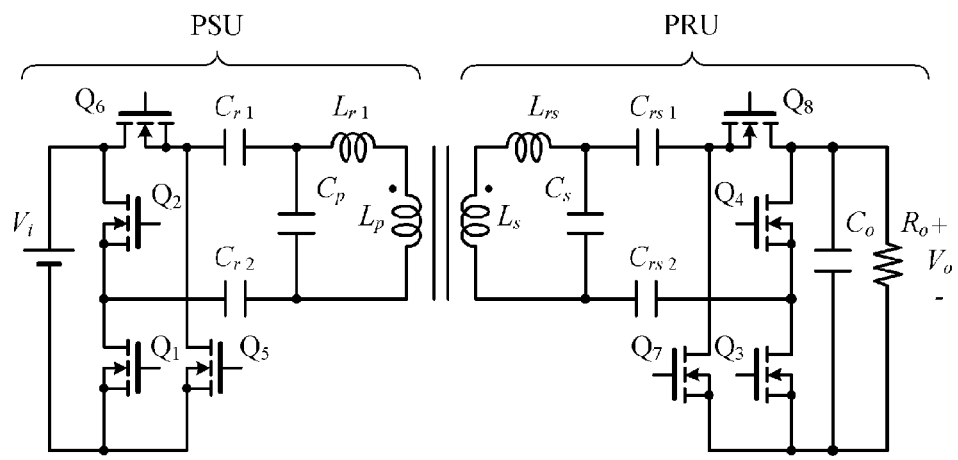
FIG. 22 is a circuit diagram of a power transfer system 127 according to a seventeenth preferred embodiment of the present invention.

FIG. 22 is a circuit diagram of a power transfer system 127 according to a seventeenth preferred embodiment. In this example, the power transmission unit PSU includes an alternating-current voltage generation circuit which is configured as a full-bridge circuit constituted by four switching elements Q1, Q2, Q5, and Q6. Also, the power reception unit PRU includes a rectifier circuit which is configured as a bridge rectifier constituted by four switching elements Q3, Q4, Q7, and Q8. The other configuration is similar to the one described in the sixteenth preferred embodiment.

According to this seventeenth preferred embodiment, a voltage applied to each of the switching elements Q1, Q2, Q5, and Q6 provided at the power transmission unit PSU side and the switching elements Q3, Q4, Q7, and Q8 provided at the power reception unit PRU side becomes a half the original voltage. Thus, a loss caused by the switching elements can be reduced. The other advantages are similar to those of the sixteenth preferred embodiment.

Eighteenth Preferred Embodiment

Figure 23:
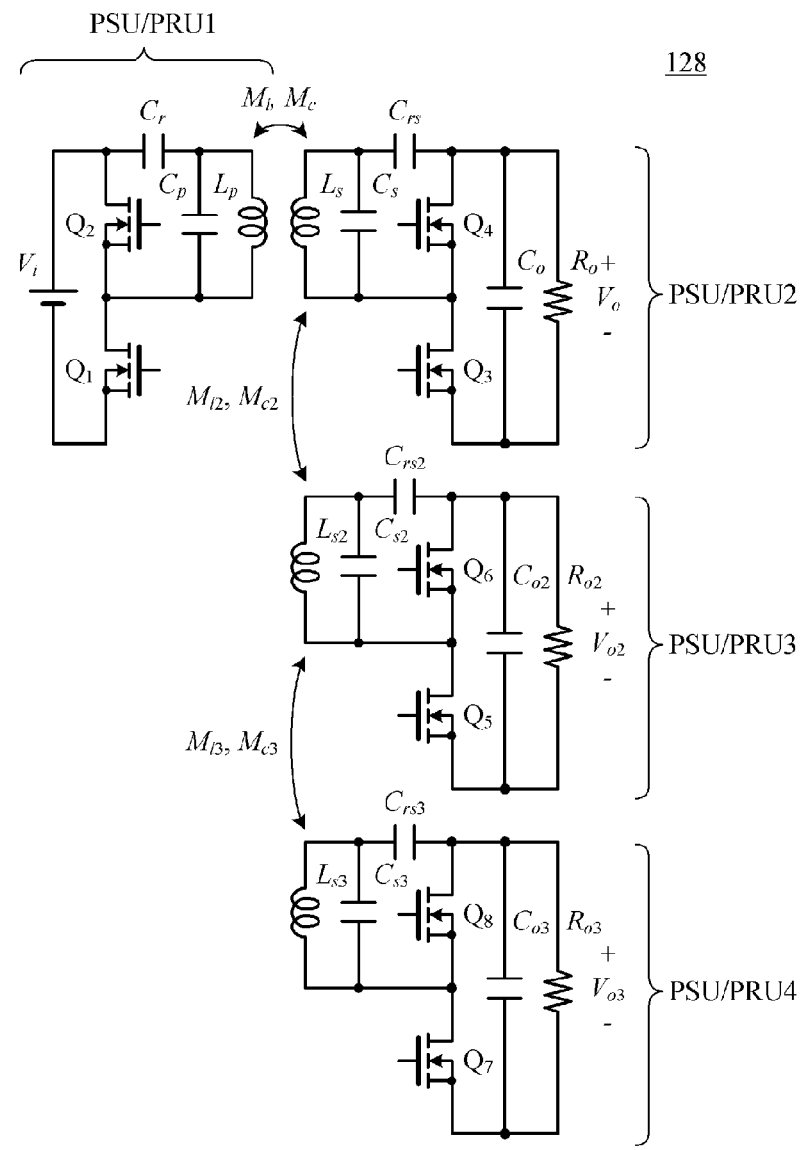
FIG. 23 is a circuit diagram of a power transfer system 128 according to an eighteenth preferred embodiment of the present invention.

FIG. 23 is a circuit diagram of a power transfer system 128 according to an eighteenth preferred embodiment.

This power transfer system 128 is a system including a plurality of power transmission/reception units PSU/PRU1, PSU/PRU2, PSU/PRU3, and PSU/PRU4, each of which is capable of performing bidirectional power transfer.

When the first power transmission/reception unit PSU/PRU1 functions as a power transmission unit, the second power transmission/reception unit PSU/PRU2 that forms electromagnetic coupling with the first power transmission/reception unit PSU/PRU1 functions as a power reception unit. Thus, power is transferred from the first power transmission/reception unit PSU/PRU1 to the second power transmission/reception unit PSU/PRU2. At this time, a load Ro of the second power transmission/reception unit PSU/PRU2 includes a rechargeable battery and a charging circuit for the rechargeable battery.

The third power transmission/reception unit PSU/PRU3 is associated with the second power transmission/reception unit PSU/PRU2. When the second power transmission/reception unit PSU/PRU2 functions as a power transmission unit, the third power transmission/reception unit PSU/PRU3 functions as a power reception unit. At this time, the rechargeable battery of the second power transmission/reception unit PSU/PRU2 is used as a power supply. Also, a load Ro2 of the third power transmission/reception unit PSU/PRU3 includes a rechargeable battery and a charging circuit for the rechargeable battery.

The fourth power transmission/reception unit PSU/PRU4 is associated with the third power transmission/reception unit PSU/PRU3. When the third power transmission/reception unit PSU/PRU3 functions as a power transmission unit, the fourth power transmission/reception unit PSU/PRU4 functions as a power reception unit. At this time, the rechargeable battery of the third power transmission/reception unit PSU/PRU3 is used as a power supply. Also, a load Ro3 of the fourth power transmission/reception unit PSU/PRU4 includes a rechargeable battery and a charging circuit for the rechargeable battery.

By including a plurality of power transmission/reception units in this manner, power can be transferred to a distant place as a result of the power being relayed by the power transmission/reception units located therebetween.

Note that resonant circuits of the plurality of power reception units may be configured to have different resonant frequencies and the power transmission units may be configured to switch the switching circuits on/off at switching frequencies suitable for the corresponding power transfer destinations. This allows power to be selectively transferred to a certain power reception unit among the plurality of power reception units.

Also, changing the switching frequency in accordance with the power transfer direction of the power transmission/reception unit makes it possible to transfer power to an intended direction (place) set for each switching frequency. That is, by performing control, such as changing the switching frequency, it is possible to select an appropriate electronic device or transmit power to an appropriate direction or place, and consequently to prevent power transfer crosstalk.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power transfer system comprising:
a power transmission unit including a power transmission coil; and
a power reception unit including a power reception coil; wherein
the power transmission unit includes:
a power-transmission-unit-side resonant capacitor that constitutes a power-transmission-unit-side resonant circuit together with the power transmission coil; and
a power-transmission-unit-side alternating-current voltage generation circuit that is connected to the power transmission coil, that includes a switching circuit, and that generates an alternating-current voltage from a direct-current voltage input thereto, the switching circuit being a parallel circuit in which a switching element, a diode, and a capacitor are connected in parallel with each other;
the power reception unit includes:
a power-reception-unit-side resonant capacitor that constitutes a power-reception-unit-side resonant circuit together with the power reception coil; and
a power-reception-unit-side rectifier circuit that is connected to the power reception coil and that rectifies an alternating-current voltage produced in the power reception coil into a direct-current voltage; wherein
mutual inductance and mutual capacitance that are equivalently generated between the power transmission coil and the power reception coil constitute an electromagnetic coupling circuit, the power-transmission-unit-side resonant circuit and the power-reception-unit-side resonant circuit resonate with each other, and power is transferred from the power transmission unit to the power reception unit;
energy of power that has not been transmitted from the power transmission unit is retained in the power-transmission-unit-side resonant circuit as resonance energy; and
energy that has not been supplied to an output among energy of power received by the power reception unit is retained in the power-reception-unit-side resonant circuit as resonance energy.

2. A power transfer system comprising:
a power transmission unit including a power transmission coil; and
a power reception unit including a power reception coil; wherein
the power transmission unit includes:
a power-transmission-unit-side resonant capacitor that constitutes a power-transmission-unit-side resonant circuit together with the power transmission coil; and
a power-transmission-unit-side alternating-current voltage generation circuit that is connected to the power transmission coil, that includes a switching circuit, and that generates an alternating-current voltage from a direct-current voltage input thereto, the switching circuit being a parallel circuit in which a switching element, a diode, and a capacitor are connected in parallel with each other;

the power reception unit includes:
- a power-reception-unit-side resonant capacitor that constitutes a power-reception-unit-side resonant circuit together with the power reception coil; and
- a power-reception-unit-side rectifier circuit that is connected to the power reception coil and that rectifies an alternating-current voltage produced in the power reception coil into a direct-current voltage; wherein mutual inductance that is equivalently generated between the power transmission coil and the power reception coil constitutes an electromagnetic coupling circuit, the power-transmission-unit-side resonant circuit and the power-reception-unit-side resonant circuit resonate with each other, and power is transferred from the power transmission unit to the power reception unit;

energy of power that has not been transmitted from the power transmission unit is retained in the power-transmission-unit-side resonant circuit as resonance energy; and energy that has not been supplied to an output among energy of power received by the power reception unit is retained in the power-reception-unit-side resonant circuit as resonance energy.

3. A power transfer system comprising:
a power transmission unit including a power transmission coil; and
a power reception unit including a power reception coil; wherein
the power transmission unit includes:
- a power-transmission-unit-side resonant inductor that constitutes a power-transmission-unit-side resonant circuit together with a power transmission capacitor; and
- a power-transmission-unit-side alternating-current voltage generation circuit that is connected to the power transmission coil, that includes a switching circuit, and that generates an alternating-current voltage from a direct-current voltage input thereto, the switching circuit being a parallel circuit in which a switching element, a diode, and a capacitor are connected in parallel with each other;

the power reception unit includes:
- a power-reception-unit-side resonant inductor that constitutes a power-reception-unit-side resonant circuit together with a power reception capacitor; and
- a power-reception-unit-side rectifier circuit that is connected to the power reception coil and that rectifies an alternating-current voltage produced in the power reception coil into a direct-current voltage; wherein mutual capacitance that is equivalently generated between the power transmission coil and the power reception coil constitutes an electrical coupling circuit, the power-transmission-unit-side resonant circuit and the power-reception-unit-side resonant circuit resonate with each other, and power is transferred from the power transmission unit to the power reception unit;

energy of power that has not been transmitted from the power transmission unit is retained in the power-transmission-unit-side resonant circuit as resonance energy; and energy that has not been supplied to an output among energy of power received by the power reception unit is retained in the power-reception-unit-side resonant circuit as resonance energy.

4. The power transfer system according to claim 1, wherein the power reception unit includes an information transmission circuit that detects output information about an output from the power-reception-unit-side rectifier circuit and transmits the output information to the power transmission unit; and
the power transmission unit includes an output information reception circuit that receives the output information, and a to-be-transferred power control circuit that controls the power-transmission-unit-side alternating-current voltage generation circuit in accordance with the output information so as to control to-be-transferred power.

5. The power transfer system according to claim 4, wherein the information transmission circuit is a circuit that transmits the output information via wireless communication; and
the output information reception circuit is a circuit that receives the output information via wireless communication.

6. The power transfer system according to claim 4, wherein the information transmission circuit is a circuit that converts an electric signal into an optical signal and transmits the output information as an optical signal; and
the output information reception circuit is a circuit that converts an optical signal into an electric signal and receives the output information as an electric signal.

7. The power transfer system according to claim 1, wherein the switching circuit includes a high-side switching circuit and a low-side switching circuit; and
the power-transmission-unit-side alternating-current voltage generation circuit controls to-be-transferred power by performing Pulse Frequency Modulation in which a switching frequency at which the high-side switching circuit and the low-side switching circuit are alternately turned on/off is changed.

8. The power transfer system according to claim 1, wherein the switching circuit includes a high-side switching circuit and a low-side switching circuit; and
the power-transmission-unit-side alternating-current voltage generation circuit controls to-be-transferred power by performing On-periods Ratio Modulation in which a ratio between conduction periods of a first switching circuit and a second switching circuit is modulated, while alternately turning the high-side switching circuit and the low-side switching circuit on/off at a fixed switching frequency.

9. The power transfer system according to claim 1, wherein the power-reception-unit-side rectifier circuit is a synchronous rectifier circuit including switching elements.

10. The power transfer system according to claim 9, wherein the power reception unit includes an operating frequency control circuit that controls an operating frequency of the synchronous rectifier circuit, and controls to-be-received power by using the operating frequency.

11. The power transfer system according to claim 1, wherein the power reception unit includes a control circuit that controls a circuit included in the power reception unit, and the control circuit is operated using power received by the power reception unit.

12. The power transfer system according to claim 1, wherein the power transfer system performs bidirectional power transfer, and
when power is transferred from an output of the power-reception-unit-side rectifier circuit, the power-reception-unit-side rectifier circuit functions as the power-transmission-unit-side alternating-current voltage generation circuit and the power-transmission-unit-side alternating-current voltage generation circuit functions as the power-reception-unit-side rectifier circuit.

13. The power transfer system according to claim 1, wherein the power transfer system includes a plurality of the power reception units, the power-reception-unit-side resonant circuits of the plurality of power reception units have different resonant frequencies, and the power-transmission-unit-side alternating-current voltage generation circuit switches the switching circuit on/off at a switching frequency corresponding to a destination to which power is to be transferred.

14. The power transfer system according to claim 7, wherein the switching frequency is set to be higher than a resonant frequency at which the power-transmission-unit-side resonant circuit and the power-reception-unit-side resonant circuit resonate with each other so that a phase of a waveform of a current that flows through the power transmission coil lags behind that of a waveform of the alternating-current voltage, and a dead time during which both the high-side switching element and the low-side switching element are in an off state is set so that a zero voltage switching operation is performed during the dead time.

15. The power transfer system according to claim 1, wherein a parallel resonant capacitor is provided in parallel with the power transmission coil or the power reception coil.

16. The power transfer system according to claim 15, wherein the parallel resonant capacitor is constituted by stray capacitance that serves as equivalent capacitance resulting from electrical coupling generated between the power transmission coil and the power reception coil.

17. The power transfer system according to claim 15, wherein the parallel resonant capacitor is constituted by stray capacitance that is generated between ends of the power transmission coil or the power reception coil.

18. The power transfer system according to claim 1, wherein the power transmission coil and the power reception coil are air-core inductors.

19. The power transfer system according to claim 1, the mutual inductance is an equivalent magnetizing inductance resulting from magnetic coupling generated between the power transmission coil and the power reception coil.

20. The power transfer system according to claim 1, wherein leakage inductance that is not involved in coupling, among an inductance component of the power transmission coil or the power reception coil, is used as an inductor that constitutes the power-transmission-unit-side resonant circuit or the power-reception-unit-side resonant circuit.

* * * * *